United States Patent
Uozumi et al.

(10) Patent No.: US 11,351,736 B2
(45) Date of Patent: Jun. 7, 2022

(54) NUMERICAL CONTROL DEVICE AND METHOD FOR CONTROLLING ADDITIVE MANUFACTURING APPARATUS

(71) Applicant: Mitsubishi Electric Corporation, Tokyo (JP)

(72) Inventors: Seiji Uozumi, Tokyo (JP); Nobuhiro Shinohara, Tokyo (JP); Daiji Morita, Tokyo (JP); Nobuyuki Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/607,420

(22) PCT Filed: Jun. 25, 2019

(86) PCT No.: PCT/JP2019/025172
§ 371 (c)(1),
(2) Date: Oct. 29, 2021

(87) PCT Pub. No.: WO2020/261386
PCT Pub. Date: Dec. 30, 2020

(65) Prior Publication Data
US 2022/0143928 A1    May 12, 2022

(51) Int. Cl.
*B33Y 50/02* (2015.01)
*B33Y 30/00* (2015.01)
(Continued)

(52) U.S. Cl.
CPC .......... *B29C 64/393* (2017.08); *B23K 26/342* (2015.10); *B29C 64/153* (2017.08);
(Continued)

(58) Field of Classification Search
CPC ... B29C 64/393; B29C 64/153; B29C 64/268; B23K 26/342; B33Y 10/00; B33Y 30/00;
(Continued)

(56) References Cited

U.S. PATENT DOCUMENTS

2017/0136578 A1    5/2017  Koshimura
2020/0030915 A1*   1/2020  Uozumi .................. B22F 10/20

FOREIGN PATENT DOCUMENTS

| JP | 2018-34514 A | 3/2018 |
|----|---|---|
| JP | 6472585 B1 | 2/2019 |
| WO | 2015/151864 A1 | 10/2015 |

OTHER PUBLICATIONS

International Search Report and Written Opinion dated Sep. 10, 2019, received for PCT Application PCT/JP2019/025172, Filed on Jun. 25, 2019, 8 pages including English Translation.
(Continued)

*Primary Examiner* — Michael J Brown
(74) *Attorney, Agent, or Firm* — Xsensus LLP

(57) ABSTRACT

An NC device, which is a numerical control device, includes: a program analyzing unit that analyzes a machining program to obtain a movement path along which to move a supply position of a material on a workpiece; a storage temperature extracting unit that extracts, from data on surface temperature of the workpiece, storage temperature in an area including the movement path on the workpiece; a layering volume calculating unit that calculates a volume of a layer forming an object on the basis of a relation between the storage temperature and a volume of the material that solidifies at the storage temperature in a given time; and a layering shape changing unit that changes a shape of the layer on the basis of the volume of the layer.

11 Claims, 17 Drawing Sheets

(51) Int. Cl.
  *B33Y 10/00* (2015.01)
  *B29C 64/393* (2017.01)
  *G05B 19/4093* (2006.01)
  *B29C 64/268* (2017.01)
  *B29C 64/153* (2017.01)
  *B23K 26/342* (2014.01)
  *G05B 19/40* (2006.01)

(52) U.S. Cl.
  CPC ............ *B29C 64/268* (2017.08); *B33Y 10/00* (2014.12); *B33Y 30/00* (2014.12); *B33Y 50/02* (2014.12); *G05B 19/40931* (2013.01); *G05B 2219/33034* (2013.01); *G05B 2219/49013* (2013.01)

(58) Field of Classification Search
  CPC .............. B33Y 50/02; G05B 19/40931; G05B 2219/33034; G05B 2219/49013
  USPC ....................................................... 700/120
  See application file for complete search history.

(56) References Cited

OTHER PUBLICATIONS

Notice of Reasons for Refusal dated Apr. 14, 2020, received for JP Application 2020-506280, 6 pages including English Translation.
Decision to Grant dated Aug. 4, 2020, received for JP Application 2020-506280, 5 pages including English Translation.

* cited by examiner

```
       20
N001  G90
N002  G43H1
N003  Mxx1

N100  G0XxYyZz
N101  G1
N102  XxYyZz

⋮
N200  ⋮ G0Xx2Yy2Zz2
N201  ⋮ G1

NN00  ⋮ G0XxNYyNZzN
NN01  ⋮ G1
NN03   XxYyZz

⋮
```

|  | LAYERING CONDITION DATA D1 | LAYERING CONDITION DATA D2 | LAYERING CONDITION DATA D3 | LAYERING CONDITION DATA D4 |
|---|---|---|---|---|
| LAYERING HEIGHT | h | 2h | 2h | h |
| LAYERING WIDTH | d | 2/d | d | 2/d |
| SPEED | F1 | F2 | F3 | F4 |
| SUPPLY AMOUNT | W1 | W2 | W3 | W4 |
| OUTPUT VALUE | P1 | P2 | P3 | P4 |

NUMERICAL CONTROL DEVICE AND METHOD FOR CONTROLLING ADDITIVE MANUFACTURING APPARATUS

CROSS-REFERENCE TO RELATED APPLICATION

The present application is based on PCT filing PCT/JP2019/025172, filed Jun. 25, 2019, the entire contents of which are incorporated herein by reference.

FIELD

The present invention relates to a numerical control device that controls an additive manufacturing apparatus, and a method for controlling an additive manufacturing apparatus.

BACKGROUND

Additive manufacturing apparatuses for manufacturing objects having solid shapes by the direct energy deposition (DED) technology are known. Some additive manufacturing apparatuses locally melt a material by a beam emitted from a machining head, and add the molten material to a workpiece. Additive manufacturing apparatuses have a feature that achieves building with high degrees of freedom. A shape that is difficult to form by cutting can be easily formed by additive manufacturing apparatuses.

In a case where an additive manufacturing apparatus is controlled by a numerical control device, machining programs to be input to the numerical control device are typically created by a computer aided manufacturing (CAM) device. The numerical control device analyzes a machining program to thereby obtain a movement path along which to move a machining head, and generate a position command, which is a group of interpolation points each defined per unit time on the movement path. The numerical control device controls an operation mechanism of the additive manufacturing apparatus in accordance with the position command. The numerical control device also generates commands according to a machining condition specified by the machining program. The numerical control device controls a beam source by generating commands in accordance with conditions on beam output. The numerical control device controls a supply source of the material such as metal powder or a metal filament by generating commands in accordance with conditions on the supply amount of the material.

Irradiation of a material and a workpiece with beams melts part of the workpiece, and a molten pool having a molten material accumulated therein is formed on the workpiece. The molten material supplied into the molten pool then solidifies, and a layer made of the solidified molten material is formed on the workpiece. The numerical control device performs adjustment for forming a target shape on various command values such as a moving speed of the machining head relative to the workpiece, a material supply amount, a beam output, and a gas supply amount.

Patent Literature 1 teaches an additive manufacturing apparatus that determines a command value for obtaining an object having a target shape on the basis of a result of monitoring changes in temperature of a molten pool.

CITATION LIST

Patent Literature

Patent Literature 1: Japanese Patent Application Laid-open No. 2018-34514

SUMMARY

Technical Problem

The storage temperature of a workpiece is changed by both heat which the workpiece irradiated with a beam receives, and heat transferred from a layer stacked on the workpiece. As the storage temperature of the workpiece when the material is layered on the workpiece is higher, the time required for the material to solidify is longer. As the time required for the material to solidify is longer, the layered material is more likely to lose the shape under the action of gravity, and it is therefore difficult for the additive manufacturing apparatus to form a target shape with high accuracy. In some case, thus, an additive manufacturing apparatus may fail to achieve high machining accuracy even when command values are determined in a manner similar to the technology of Patent Literature 1.

The present invention has been made in view of the above, and an object thereof is to provide a numerical control device that enables an additive manufacturing apparatus to perform machining with high machining accuracy.

Solution to Problem

To solve the aforementioned problems and achieve the object, a numerical control device according to the present invention controls, in accordance with a machining program, an additive manufacturing apparatus that produces an object by layering a molten material on a workpiece. A numerical control device according to the present invention includes: a program analyzing unit that analyzes a machining program to obtain a movement path along which to move a supply position of a material on a workpiece; a storage temperature extracting unit that extracts, from data on surface temperature of the workpiece, storage temperature in an area including the movement path on the workpiece; a layering volume calculating unit that calculates a volume of a layer forming the object on the basis of a relation between the storage temperature and a volume of the material that solidifies at the storage temperature in a given time; and a layering shape changing unit that changes a shape of the layer on the basis of the volume of the layer.

Advantageous Effects of Invention

A numerical control device according to the present invention produces an advantageous effect of enabling the additive manufacturing apparatus to perform the machining with the high machining accuracy.

DESCRIPTION OF EMBODIMENTS

A numerical control device and a method for controlling an additive manufacturing apparatus according to certain embodiments of the present invention will be described in detail below with reference to the drawings. Note that the present invention is not limited to the embodiments. In the description below, the numerical control device may be referred to as a numerical control (NC) device.

First Embodiment

Figure 1:
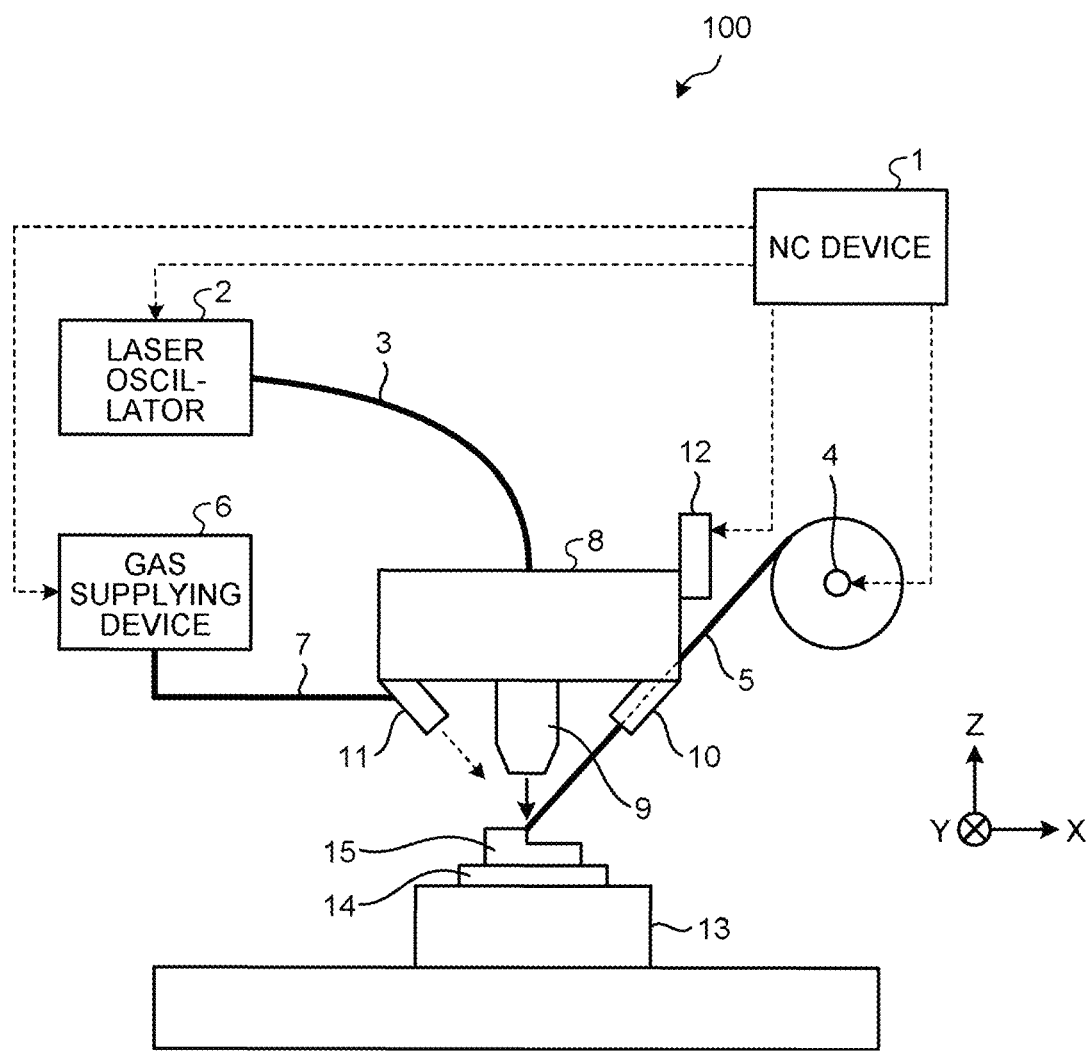
FIG. 1 is a diagram illustrating an additive manufacturing apparatus controlled by a numerical control device according to a first embodiment of the present invention.

FIG. 1 is a diagram illustrating an additive manufacturing apparatus controlled by a numerical control device according to a first embodiment of the present invention. The additive manufacturing apparatus 100 is a machine tool for manufacturing an object 15 by adding a molten material 5 to a workpiece. In the first embodiment, a beam is a laser beam, and the material 5 is a metal filament. The material 5 used in the additive manufacturing apparatus 100 is not limited to a metal filament, and may be metal powder.

The additive manufacturing apparatus 100 forms an object 15 on the surface of a base material 14 by stacking layers formed by solidification of the molten material 5. The base material 14 is placed on a stage 13. In the following description, the workpiece, which has the molten material 5 added thereto, refers to the base material 14 and the object 15. The base material 14 illustrated in FIG. 1 is a plate. The base material 14 may be a material other than a plate.

The additive manufacturing apparatus 100 includes a machining head 8. The machining head 8 has a beam nozzle 9, a material nozzle 10, and a gas nozzle 11. The beam nozzle 9 emits a laser beam toward the workpiece. The material nozzle 10 advances the material 5 toward a laser-beam irradiation position on the workpiece. The gas nozzle 11 emits a jet of gas toward the workpiece. With gas jets, the additive manufacturing apparatus 100 inhibits oxidation of the modeled object 15 and cools the layers formed on the workpiece.

A laser oscillator 2, which is a beam source, emits an oscillating laser beam. The laser beam from the laser oscillator 2 is propagated to the beam nozzle 9 via a fiber cable 3, which is an optical transmission path. A gas supplying device 6 supplies gas to the gas nozzle 11 via piping 7.

A material supplying device 4 is a supply source of the material 5. The material supplying device 4 includes a driving unit for feeding the material 5, which is a metal filament. The material 5 fed from the material supplying device 4 passes through the material nozzle 10 and is supplied to the irradiation position of the laser beam.

A head drive unit 12 includes servomotors defining an operation mechanism for moving the machining head 8. The head drive unit 12 moves the machining head 8 in each of an X-axis direction, a Y-axis direction, and a Z-axis direction. The X axis, the Y axis, and the Z axis are three axes perpendicular to one another. The X axis and the Y axis are parallel to the horizontal direction. The Z-axis direction is the vertical direction. In FIG. 1, the servomotors are not illustrated. In the additive manufacturing apparatus 100, the head drive unit 12 moves the machining head 8 to move the laser-beam irradiation position on the workpiece.

The machining head 8 illustrated in FIG. 1 emits the laser beam in the Z-axis direction from the beam nozzle 9. The material nozzle 10 is located at a position away from the beam nozzle 9 in the XY plane, and advances the material 5 in a direction at an angle to the Z axis. The machining head 8 is not limited to that which advances the material 5 in a direction at an angle to the Z axis, and may advance the material 5 along the central axis of the laser beam emitted from the beam nozzle 9. Thus, the beam nozzle 9 and the material nozzle 10 may be arranged coaxially with each other. In this case, the beam nozzle 9 emits a laser beam having its cross sectional shape adjusted to a ring shape around the material 5, or emits a plurality of beams distributed around the material 5. Such laser beams are adjusted so as to converge at the irradiation position on the workpiece.

The gas nozzle 11 is located at a position away from the beam nozzle 9 in the XY plane, and emits a jet of gas in a direction at an angle to the Z axis. The gas nozzle 11 is not limited to that which emits a jet of gas in a direction at an angle to the Z axis, and may emit a jet of gas along the central axis of the laser beam emitted from the beam nozzle 9. Thus, the beam nozzle 9 and the gas nozzle 11 may be arranged coaxially.

The additive manufacturing apparatus 100 moves the laser-beam irradiation position on the workpiece by moving the machining head 8 relative to the workpiece. Alternatively, the additive manufacturing apparatus 100 may move the laser-beam irradiation position on the workpiece by moving the workpiece relative to the machining head 8. Note that, in the description below, the laser-beam irradiation position may simply be referred to as the "irradiation position".

An NC device 1 controls the additive manufacturing apparatus 100 in accordance with a machining program. The NC device 1 outputs a position command to the head drive unit 12 to control the position of the head drive unit 12. The NC device 1 outputs an output command to the laser oscillator 2 to control the laser oscillation of the laser oscillator 2. The output command is a command according to the condition of beam output.

The NC device 1 outputs a supply command to the material supplying device 4 to control the material supplying device 4. The supply command is a command according to the condition of the amount of supply of the material 5. When the material 5 is a metal filament, the supply command output from the NC device 1 may be a command according to the condition of the supply rate of the material 5. The supply rate is the speed of the material 5 moving from the material supplying device 4 toward the irradiation position. The supply rate refers to the amount of supply of the material 5 per hour.

The NC device 1 outputs a command according to the condition of the gas supply amount to the gas supplying device 6 to thereby control the amount of gas supply from the gas supplying device 6 to the gas nozzle 11. Note that the NC device 1 may be one of the components of the additive manufacturing apparatus 100 or a device external to the additive manufacturing apparatus 100.

Figure 2:
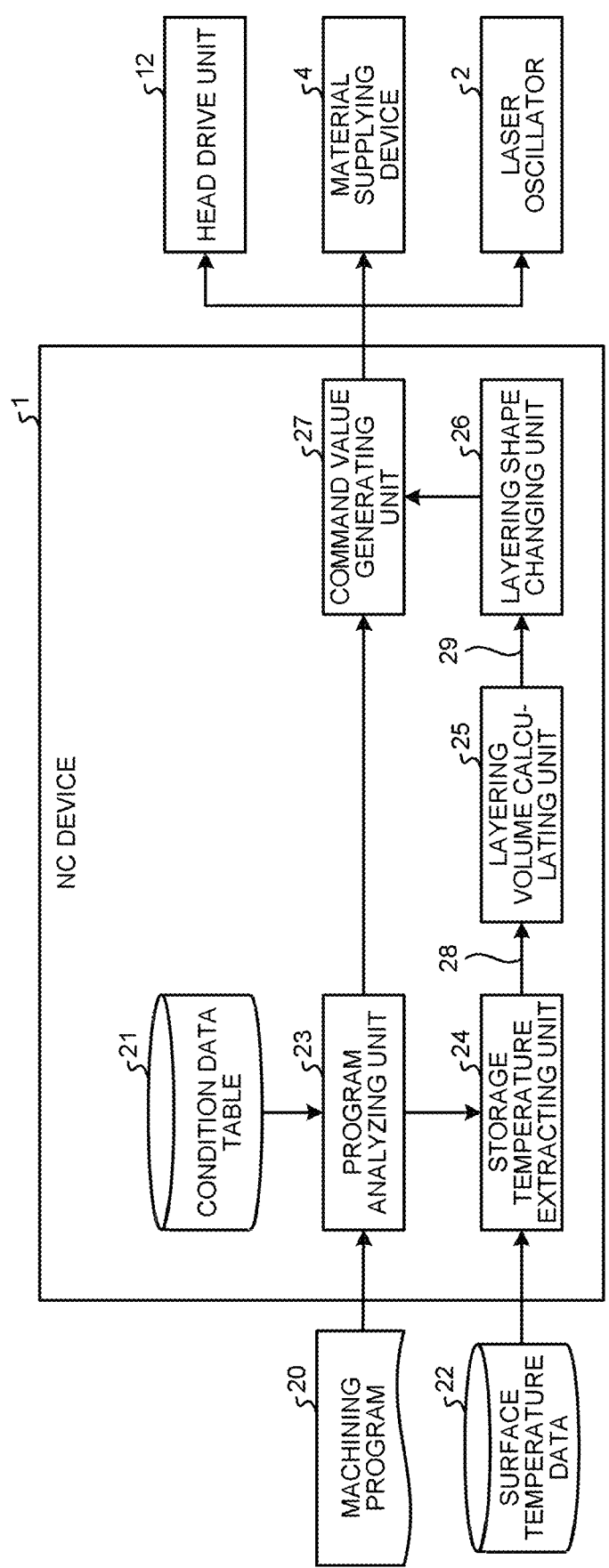
FIG. 2 is a diagram illustrating a functional configuration of the numerical control device according to the first embodiment.

FIG. 2 is a diagram illustrating a functional configuration of the numerical control device according to the first embodiment. A machining program 20, which is an NC program, is input to the NC device 1. The machining program 20 is created by a CAM device. The NC device 1 includes a condition data table 21 having layering condition data stored therein. The layering condition data will be described later.

The NC device 1 includes a program analyzing unit 23 that analyzes the machining program 20, and a command value generating unit 27 that generates various command values. The program analyzing unit 23 analyzes processes that are to be performed after a process being currently performed in the machining program 20. The program analyzing unit 23 analyzes the contents of processes described in the machining program 20 to thereby obtain a movement path along which to move a supply position of the material 5 on the workpiece. In the description below, analysis of processes to be performed after the process being currently performed may be referred to as pre-reading.

The program analyzing unit 23 outputs data indicating the movement path to the command value generating unit 27 and a storage temperature extracting unit 24, which will be described later. The command value generating unit 27 generates position commands that are a group of interpolation points on the movement path. Each of the interpolation points is defined per unit time. The command value generating unit 27 outputs the position commands to the head drive unit 12. The head drive unit 12 drives the machining head 8 in accordance with the position commands.

The program analyzing unit 23 obtains the supply amount of the material 5 to be supplied to the irradiation position, and a laser beam output. The program analyzing unit 23 outputs a command value of the supply amount and a command value of the laser beam output, to the command value generating unit 27. The command value generating unit 27 generates an output command of the laser beam and a supply command of the material 5 on the basis of the input command values. The command value generating unit 27 outputs the output command of the laser beam to the laser oscillator 2. The laser oscillator 2 emits an oscillating laser beam in accordance with the output command. The command value generating unit 27 outputs the supply command to the material supplying device 4. The material supplying device 4 supplies the material 5 in accordance with the supply command. The NC device 1 outputs various commands to control the entire additive manufacturing apparatus 100.

Surface temperature data 22 indicating the surface temperature of the workpiece is input to the NC device 1. A device, such as a radiation thermometer or an infrared thermograph, which measures the surface temperature is installed in the additive manufacturing apparatus 100. The surface temperature data 22 is input from the device to the NC device 1. In FIGS. 1 and 2, the device that measures the surface temperature is not illustrated.

The NC device 1 includes the storage temperature extracting unit 24, a layering volume calculating unit 25, and, a layering shape changing unit 26. The storage temperature extracting unit 24 extracts, from the surface temperature data 22, storage temperature in an area including the movement path on the workpiece. The layering volume calculating unit 25 calculates a volume of a layer forming an object, on the basis of the relation between storage temperature and the volume of the material that solidifies in a given time at the storage temperature. The layering shape changing unit 26 changes the shape of the layer on the basis of the calculated volume. The storage temperature extracting unit 24 outputs storage temperature data 28 to the layering volume calculating unit 25. The layering volume calculating unit 25 outputs layering volume data 29 to the layering shape changing unit 26. The layering shape changing unit 26 outputs data indicating the changed shape of layers, to the command value generating unit 27.

Next, a hardware configuration of the NC device 1 will be described. The respective functional units of the NC device 1 illustrated in FIG. 2 are implemented by executing programs for performing a method for controlling the additive manufacturing apparatus 100 by hardware. In the description below, the programs for performing the method for controlling the additive manufacturing apparatus 100 may be referred to as control programs.

Figure 3:
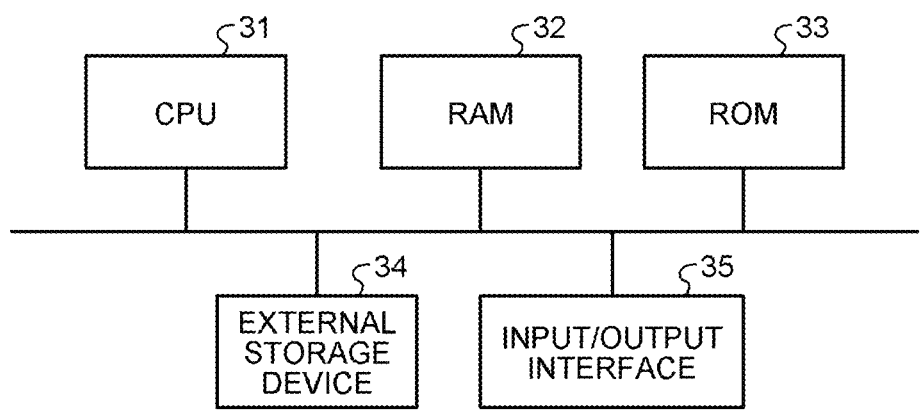
FIG. 3 is a block diagram illustrating a hardware configuration of the numerical control device according to the first embodiment.

FIG. 3 is a block diagram illustrating a hardware configuration of the numerical control device according to the first embodiment. The NC device 1 includes a central processing unit (CPU) 31 that performs various processes, a random access memory (RAN) 32 including a data storage area, a read only memory (ROM) 33, which is a nonvolatile memory, an external storage device 34, and an input/output interface 35 for inputting information to the NC device 1 and outputting information from the NC device 1. The respective components illustrated in FIG. 3 are connected with each other via a bus.

The CPU 31 executes programs stored in the ROM 33 and the external storage device 34. The program analyzing unit 23, the storage temperature extracting unit 24, the layering volume calculating unit 25, the layering shape changing unit 26, and the command value generating unit 27 illustrated in FIG. 2 are implemented with use of the CPU 31.

The external storage device 34 is a hard disk drive (HDD) or a solid state drive (SSD). The external storage device 34 stores the control programs and various data. The external storage device 34 stores the condition data table 21 illustrated in FIG. 2. The ROM 33 stores software or a program for controlling hardware, which is a basic input/output system (BIOS) that is a basic program for controlling a computer or a controller that is the NC device 1 or a boot loader such as a unified extensible firmware interface (UEFI). Note that the control programs may be stored in the ROM 33.

The programs stored in the ROM 33 and the external storage device 34 are loaded into the RAM 32. The CPU 31 develops the control programs in the RAM 32 to perform various processes. The input/output interface 35 is an interface for connection with devices external to the NC device 1. The machining program 20 and the surface temperature data 22 are input to the input/output interface 35. In addition, the input/output interface 35 outputs various commands. The NC device 1 may include an input device such as a keyboard and a pointing device, and an output device such as a display.

The programs for performing the method for controlling the additive manufacturing apparatus 100 according to the first embodiment may be stored in a storage medium readable by a computer. The NC device 1 may store the control programs stored in a storage medium into the external storage device 34. The storage medium may be a portable storage medium, which is a flexible disk, or a flash memory, which is a semiconductor memory. The control programs may be installed into a computer or a controller that is the NC device 1 from another computer or a server via a communication network.

The functions of the NC device 1 may be implemented by processing circuitry that is dedicated hardware for controlling the additive manufacturing apparatus 100. The processing circuitry is a single circuit, a composite circuit, a programmed processor, a parallel-programmed processor, an application specific integrated circuit (ASIC), a field-programmable gate array (FPGA), or a combination thereof. Some of the functions of the NC device 1 may be implemented by dedicated hardware, and others may be implemented by software or firmware.

Figure 4:
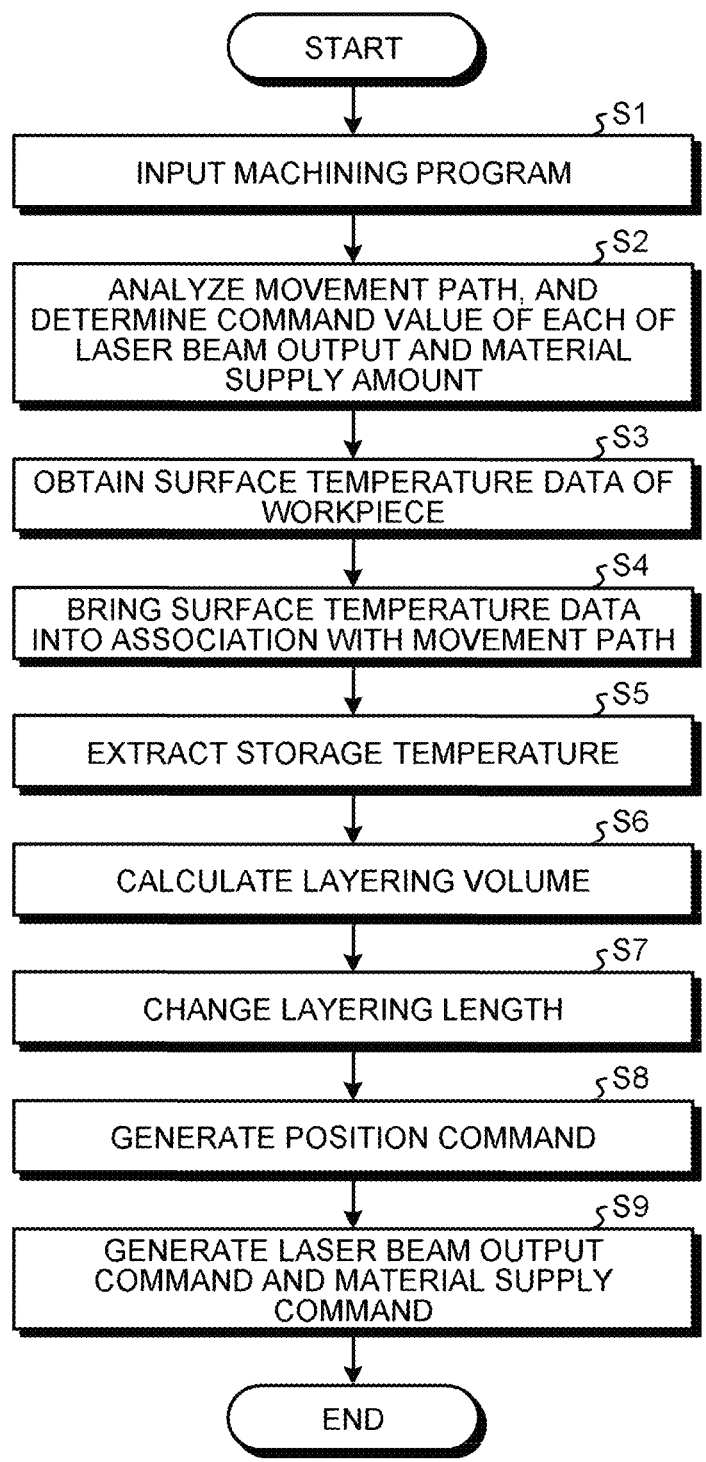
FIG. 4 is a flowchart illustrating procedures of operation performed by the numerical control device according to the first embodiment.

Next, the operation of the NC device 1 will be explained. FIG. 4 is a flowchart illustrating procedures of operation performed by the numerical control device according to the first embodiment. In step S1, a machining program 20 is input to the program analyzing unit 23.

The machining program 20 describes movement commands for moving the irradiation position on a preset path, and speed commands for moving the irradiation position at preset speeds. The content of a movement command in the machining program 20 is specified by G codes. A G code is expressed by a combination of the character "G" and a number. The content of a speed command is specified by F codes. An F code is expressed by a combination of the character "F" and a number representing a speed value.

The layering condition data stored in the condition data table 21 is a set of: information indicating a height and a width, of a layer to be formed on the workpiece; and conditions required for forming the layer having that height and that width. The information indicating the conditions required for the formation of the layer includes a laser beam output value, the amount of supply of the material 5, and the speed at which the irradiation position is to be moved. At least one set of layering condition data is stored in the condition data table 21.

The laser beam output value and the amount of supply of the material 5 for forming a layer having a desired height and a desired width by the functions of G codes or M codes described in the machining program 20 are obtained on the basis of the layering condition data. An M code is expressed by a combination of the character "M" and a number. Alternatively, the machining program 20 may describe the laser beam output value and the value of the amount of supply of the material 5 for forming a layer having a desired height and a desired width. After performing step S1, the NC device 1 advances the procedure to step S2.

In step S2, the program analyzing unit 23 analyzes the movement path of the supply position of the material 5 on the workpiece, and determines a command value of each of the laser beam output and the amount of supply of the material 5. The program analyzing unit 23 analyzes the movement path of the supply position on the basis of the contents of processes described in the machining program 20. The program analyzing unit 23 outputs data on the movement path, to the command value generating unit 27 and the storage temperature extracting unit 24. The program analyzing unit 23 outputs a speed command described in the machining program 20, to the command value generating unit 27. The program analyzing unit 23 also determines a command value of the laser beam output and a command value of the amount of supply of the material 5 on the basis of the description in the machining program 20 and the layering condition data. After performing step S2, the NC device 1 advances the procedure to step S3.

In step S3, the storage temperature extracting unit 24 obtains the surface temperature data 22 on the workpiece. The surface temperature data 22 is heat map image data that is color-coded to show distribution of the surface temperature. In the heat map, a diagram illustrating the shape of the workpiece is color-coded. The surface temperature data 22 is static image data showing the distribution of the surface temperature at a certain time. The surface temperature data 22 may be part of video data showing transition of the heat map. The surface temperature data 22 is not limited to image data. The surface temperature data 22 may be data including association between coordinates indicating positions on the workpiece and numerical values indicating the surface temperature. The surface temperature may be measured by a plurality of temperature sensors. The temperature sensors are installed at positions in directions different from each other from the workpiece.

The surface temperature data 22 is not limited to measured values of the surface temperature. The surface temperature data 22 may be estimated values of the surface temperature. An estimation formula used for calculating an estimated value may be an estimation formula created on the basis of the movement path of the irradiation position, and process parameters such as the laser beam output value, the amount of supply of the material 5, and the type of the material 5. The process parameters are various parameters set for controlling layer formation. The storage temperature extracting unit 24 calculates an estimated value on the basis of the estimation formula. After performing step S3, the NC device 1 advances the procedure to step S4.

Figure 5:
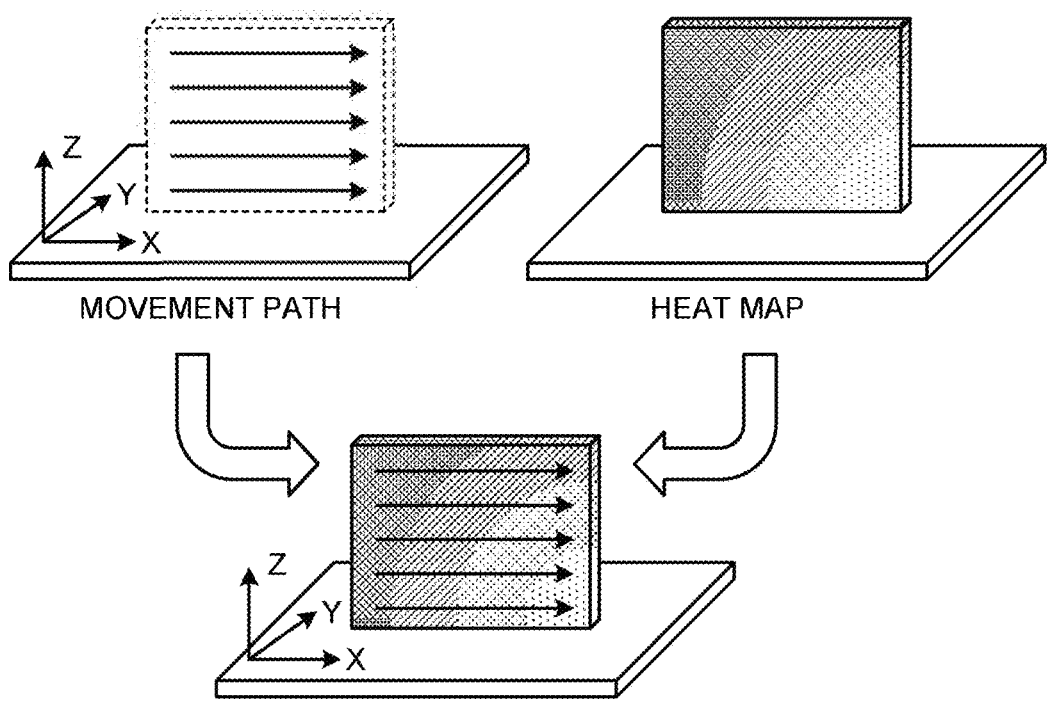
FIG. 5 is a diagram schematically illustrating association between surface temperature data obtained by a storage temperature extracting unit of the numerical control device according to the first embodiment and a movement path.

In step S4, the storage temperature extracting unit 24 brings the surface temperature data 22 into association with the movement path of the supply position on the workpiece. FIG. 5 is a diagram schematically illustrating the association between the movement path and the surface temperature data obtained by the storage temperature extracting unit of the numerical control device according to the first embodiment. In FIG. 5, the distribution of the surface temperature is expressed by tone densities. As the tone is darker, the surface temperature is higher.

The storage temperature extracting unit 24 extracts program feature quantities presented in the data on the movement path, and image feature quantities presented in the heat map. The program feature quantities are feature quantities indicating the shape of the layer to be formed. The program feature quantities are the content of a movement command, a result of detection of an edge at each command position, a movement distance, the layering direction, the width of the layer, the height of the layer, and the like. The storage temperature extracting unit 24 calculates program feature quantities at each command position. The image feature quantities are calculated with use of image analysis techniques such as edge detection and binarization.

The storage temperature extracting unit 24 collates the program feature quantities and the image feature quantities with each other to thereby bring the surface temperature data 22 into association with the movement path. In this manner, the storage temperature extracting unit 24 identifies the distribution of the surface temperature of the workpiece in a program coordinate system. Note that the program coordinate system refers to a coordinate system used for specifying the movement path in the machining program 20. An XYZ coordinate system illustrated in FIG. 5 is the program coordinate system. In step S4, the storage temperature extracting unit 24 may collate three or more feature quantities instead of two feature quantities, which are the program feature quantities and the image feature quantities. After performing step S4, the NC device 1 advances the procedure to step S5.

In step S5, the storage temperature extracting unit 24 extracts, from the surface temperature data 22 on the workpiece, the storage temperature in an area including the movement path. The storage temperature extracting unit 24 extracts a surface temperature in a section of the movement path indicated by a pre-read movement command and a peripheral area of the movement path in the section to thereby extract the storage temperature in the movement path and the peripheral area. The peripheral area whose storage temperature is to be extracted is defined as an area whose accumulated heat can affect a layer formed on the movement path.

The storage temperature extracting unit 24 extracts the storage temperature of the entire section of the movement path. The storage temperature extracting unit 24 outputs data on the extracted storage temperature to the layering volume calculating unit 25. Note that the storage temperature extracting unit 24 need not extract the storage temperature of the entire section of the movement path, and instead may extract a storage temperature of part of the section of the movement path. The storage temperature extracting unit 24 may extract a storage temperature of a part having a pre-specified length of the section of the movement path. The storage temperature extracting unit 24 may extract storage temperatures of parts of the section of the movement path, which parts are indicated by a pre-specified number of movement commands. The length of the movement path or the number of movement commands is specified by, for example, the user of the NC device 1 inputting a parameter. The range of the peripheral area whose storage temperature is to be extracted may be set by, for example, user inputting a parameter. The storage temperature extracting unit 24 may determine the range over which the storage temperature is extracted on the basis of the movement path and the process parameters. After performing step S5, the NC device 1 advances the procedure to step S6.

In step S6, the layering volume calculating unit 25 calculates a layering volume defined as a volume of a part of a layer forming the object 15. This part having the layering volume is defined as being formed by a single building. A single building refers to forming a layer from a start of addition of the material 5 until a termination of the addition of the material 5. Each layer of the object 15 may be formed by a plurality of times of building. On the basis of the relational expression expressing the relation between the layering volume and the storage temperature, the layering volume calculating unit 25 calculates the layering volume associated with the storage temperature extracted in step S5.

Figure 6:
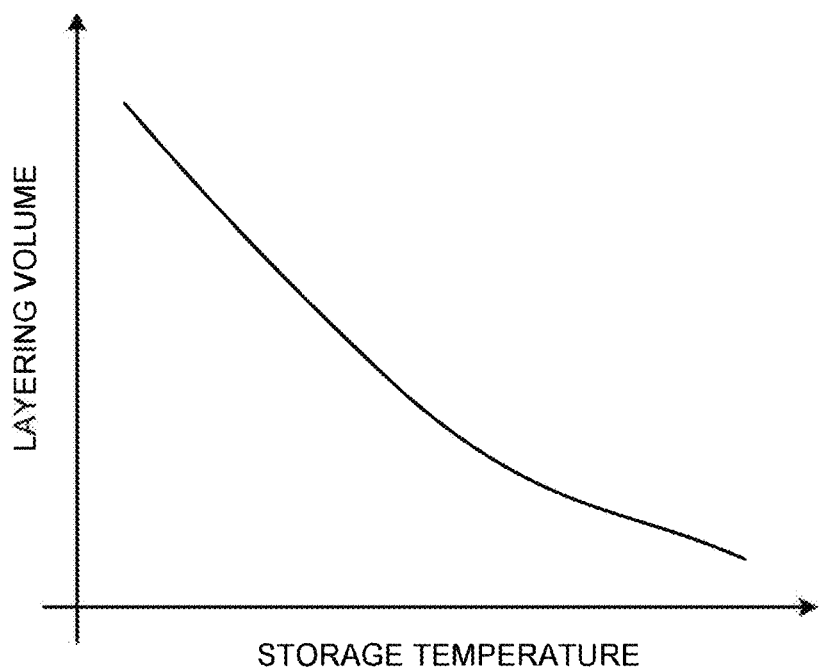
FIG. 6 is a graph illustrating an example of a relational expression used for calculation of a layering volume by a layering volume calculating unit of the numerical control device according to the first embodiment.

FIG. 6 is a graph illustrating an example of a relational expression used for calculation of the layering volume by the layering volume calculating unit of the numerical control device according to the first embodiment. FIG. 6 illustrates a graph of the relational expression. In the graph illustrated in FIG. 6, the horizontal axis represents the storage temperature, and the vertical axis represents the layering volume.

As the storage temperature of the workpiece is higher, the time taken for the molten material 5 to solidify is longer. The relational expression indicates that the storage temperature and the layering volume interrelate to allow the material 5 added to the workpiece to solidify when a given time has passed. The relation between a storage temperature and the volume of the material 5 that solidifies in the given time at the storage temperature is a relation in which the volume of the material 5 decreases as the storage temperature becomes higher. In other words, the relation between the layering volume and the storage temperature is a relation in which the layering volume decreases as the storage temperature becomes higher. The layering volume calculating unit 25 can thus obtain the layering volume of the material 5 that solidifies in the given time. The layering volume calculating unit 25 outputs, to the layering shape changing unit 26, a value that is the result of calculation of the layering volume.

The length of time necessary for the material 5 to solidify also varies depending on the amount of heat transferred from the added material 5 to the workpiece. The layering volume calculating unit 25 may select a relational expression, from among a plurality of relational expressions created on the basis of the process parameters, depending on layering condition data specified on the basis of a height and a width, of a layer. The layering volume calculating unit 25 holds relational expressions created on the basis of the process parameters such as the laser beam output, the amount of supply of the material 5, the type of the material 5, and the thermal conductivity of the workpiece. The layering volume calculating unit 25 uses the relational expression varying depending on the amount of heat transferred from the material 5 to the workpiece to thereby obtain a layering volume that can further reduce the variation in the time for the material 5 to solidify.

Alternatively, the layering volume calculating unit 25 may calculate the layering volume by using a relational expression set by, for example, a user inputting a parameter. The layering volume calculating unit 25 may obtain a result of calculation of the layering volume by accessing a server connected online with the NC device 1. Such a server holds relational expressions, and calculates a layering volume associated with a storage temperature on the basis of the data on the storage temperature transmitted from the NC device 1.

The layering volume calculating unit 25 obtains a representative value of the storage temperature in an area including the movement path on the basis of the data on the storage temperature in the area, and calculates a layering volume associated with the representative value. The representative value is a temperature value selected from among a plurality of preset temperature values. The representative value may be such a value as a maximum value of the storage temperature, an average value of the storage temperature, or a minimum value of the storage temperature. In addition, the layering volume calculating unit 25 may change the value as the representative value, depending on the position on the movement path on the workpiece. In this case, the layering volume calculating unit 25 can calculate a layering volume on the basis of an optimal storage temperature depending on the position on the workpiece. After performing step S6, the NC device 1 advances the procedure to step S7.

In step S7, the layering shape changing unit 26 changes a layering length on the basis of the layering volume calculated in step S6. The layering length is the length of a layer in a length direction in which the irradiation position is moved. The layering length is the length of a layer formed by a single building. When the layering volume is represented by "V", the layering height is represented by "h", the layering width is represented by "d", and the layering length is represented by "l", formula (1) below is satisfied. The layering shape changing unit 26 calculates the layering length by using formula (1) below.

[Formula 1]

$$l = \frac{V}{f(h, d)} \quad (1)$$

The layering height is a height of a layer in the height direction in which layers are stacked. The layering height is defined as a height of a layer formed by a single building. The layering width is a width of a layer in the width direction perpendicular to the length direction and the height direction. The layering width is defined as a width of a layer formed by a single building. The layering shape refers to a three-dimensional shape of a layer formed by a single building.

In formula (1), f(h,d) represents a cross-sectional area of the layer. The cross-sectional area is an area of a cross section perpendicular to the length direction. The cross-sectional area is expressed by a function of the layering height and the layering width. The cross-sectional area can be calculated by approximating the cross section of the layer to such a shape as an ellipse or a quadrangle. The layering shape changing unit 26 outputs a value that is the result of calculation of the layering length to the command value generating unit 27. After performing step S7, the NC device 1 advances the procedure to step S8.

In step S8, the command value generating unit 27 generates a position command on the basis of the layering length calculated in step S6 and the speed indicated by the speed command. The command value generating unit 27 outputs the generated position command to the head drive unit 12.

In step S9, the command value generating unit 27 generates an output command of the laser beam and a supply command of the material 5. The command value generating unit 27 generates the output command of the laser beam on the basis of the command value determined in step S2. The command value generating unit 27 generates the supply command of the material 5 on the basis of the command value determined in step S2. Furthermore, the command value generating unit 27 adjusts the generated output command to the position command generated in step S8. The command value generating unit 27 adjusts the generated supply command to the position command generated in step S8. The command value generating unit 27 outputs the output command to the laser oscillator 2. The command value generating unit 27 outputs the supply command to the material supplying device 4.

As a result of performing step S9, the NC device 1 terminates the operation according to the procedures illustrated in FIG. 4. The additive manufacturing apparatus 100 emits an oscillating laser beam in accordance with the output command, moves the machining head 8 in accordance with the position command, and supplies the material 5 in accordance with the supply command. As a result of the operation of the NC device 1 according to the procedures illustrated in FIG. 4, the additive manufacturing apparatus 100 can obtain a desired layering shape.

Figures 7, 8:
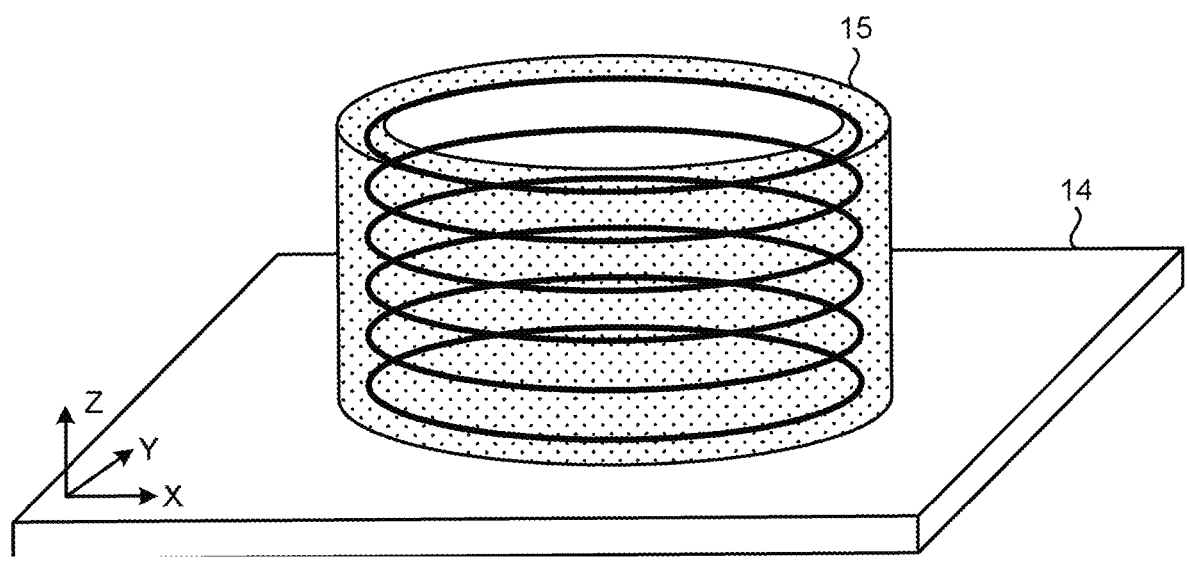
FIG. 7 is a diagram illustrating an example of a machining program input to a program analyzing unit of the numerical control device according to the first embodiment.
FIG. 8 is a diagram illustrating an example of an object built in accordance with the machining program illustrated in FIG. 7.

FIG. 7 is a diagram illustrating an example of a machining program input to the program analyzing unit of the numerical control device according to the first embodiment. The machining program 20 is input to the program analyzing unit 23 from outside of the NC device 1. FIG. 8 is a diagram illustrating an example of an object built in accordance with the machining program illustrated in FIG. 7. Assume that a plurality of annular layers is stacked in the Z-axis direction to thereby form an object 15.

Assume that a condition necessary for forming a layer having a target layering height "h" and a target layering width "d" is: a laser beam output value "P1"; an amount of supply "W1" of the material 5; and a speed "F1" at which the irradiation position is moved. In this case, layering condition data including the values of the layering height "h", the layering width "d", the output value "P1", the supply amount "W1", and the speed "F1" will be referred to as layering condition data "D1". In the machining program 20 illustrated in FIG. 7, a block "N003" specifies the layering condition data "D1" as the condition for forming the individual layers of the object 15. The condition for forming the individual layers is not limited to that specified in the machining program 20, and may be specified by user's input operations, or may be specified by a device external to the NC device 1.

The target layering height and layering width are not limited to those specified in the machining program 20, and may be specified by user's input operations or specified by an external device. The user or the external device can specify the target layering height and layering width by selecting a condition for forming the layer from a plurality of conditions that differ in at least one of the layering height "h" and the layering width "d".

Blocks "N100", "N101", "N102", . . . in the machining program 20 indicate processes for forming a first layer. The first layer is a first formed layer of the object 15. The block "N100" indicates positioning through rapid traverse movement to the position of coordinates (x,y,z). The block "N101" indicates movement of the machining head 8 in a mode specified by "G1", which is a G code. The block "N102" and blocks subsequent to the block "N102" indicate coordinate values for expressing the shape of the first layer.

Blocks "N200", "N201", "N202", . . . in the machining program 20 indicate processes for forming a second layer. The second layer, which is a second formed layer of the object 15, is formed next to the first layer. The block "N200" indicates positioning by rapid traverse movement to the position of coordinates (x2,y2,z2). The block "N201" indicates movement of the machining head 8 in a mode specified by "G1", which is a G code. The block "N202" and blocks subsequent to the block "N202" indicate coordinate values for expressing the shape of the second layer.

Processes for forming layers after the second layer are described in the machining program 20 in a manner similar to the first layer and the second layer. Blocks "NN00", "NN01", "NN02", . . . in the machining program 20 indicate processes for forming an N-th layer, which is a layer formed after the second layer.

Next, the operations of the respective components of the NC device 1 will be explained in detail.

(Program Analyzing Unit 23)

The program analyzing unit 23 pre-reads the machining program 20 illustrated in FIG. 7 to thereby analyze a movement path L(i) along which to move the machining head 8. "i" represents a layer number. The individual layers of the object 15 are assigned numbers indicating the order in which the layers are formed. The program analyzing unit 23 outputs data indicating the movement path L(i) to the command value generating unit 27 and the storage temperature extracting unit 24.

The program analyzing unit 23 reads, from the condition data table 21, the layering condition data "D1" specified in the machining program 20. The program analyzing unit 23 reads the layering condition data "D1" to obtain the values of the output value "P1", the supply amount "W1", and the speed "F1". The program analyzing unit 23 outputs the values of the output value "P1", the supply amount "W1", and the speed "F1" to the command value generating unit 27. Note that the program analyzing unit 23 analyzes the machining program 20 about the layers in parallel to the processes performed by the storage temperature extracting unit 24, the layering volume calculating unit 25, and the layering shape changing unit 26.

(Storage Temperature Extracting Unit 24)

The storage temperature extracting unit 24 obtains the surface temperature data 22 on the workpiece. The surface temperature data 22 is image data on a heat map K(t). "t" represents time. The storage temperature extracting unit 24 brings the surface temperature data 22 into association with the movement path L(i), and extracts the storage temperature of the movement path L(i) and the peripheral area of the movement path L(i).

Figure 9:
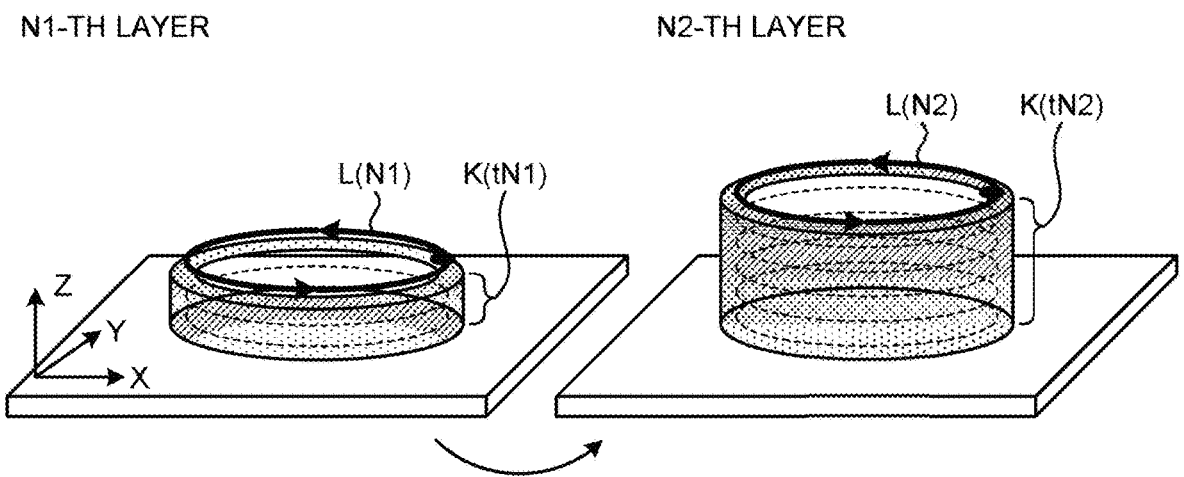
FIG. 9 is a diagram illustrating examples of heat maps obtained by a storage temperature extracting unit of the numerical control device according to the first embodiment.

FIG. 9 is a diagram illustrating examples of heat maps obtained by the storage temperature extracting unit of the numerical control device according to the first embodiment. FIG. 9 illustrates a heat map K(tN1) at time "tN1" when an N1-th layer is formed, and a heat map K(tN2) at time "tN2" when an N2-th layer is formed. The N1-th layer is one of two given layers, and the N2-th layer is the other of these two layers. The N1-th layer is a layer where i=N1. The N2-th layer is a layer where i=N2. N1 and N2 are any numbers of 1, 2, . . . N, . . . that satisfy N1<N2.

The movement path L(N1) is a movement path for forming the N1-th layer. The movement path L(N1) is an annular path. The movement path L(N2) is a movement path for forming the N2-th layer. The movement path L(N2) is an annular path similar to the movement path L(N1). The movement path L(N2) is the same as the movement path L(N1) except that the movement path L(N2) is at a position higher than the movement path L(N1) in the Z-axis direction.

The storage temperature extracting unit 24 extracts a program feature quantity "PA" and an image feature quantity "PB" about the N1-th layer. The program feature quantity "PA" is presented in the data on the movement path L(N1) and the image feature quantity "PB" is presented in the heat map K(tN1). Each of the program feature quantity "PA" and the image feature quantity "PB" is a feature quantity of a layer shape, which is at least one of elements expressing the shape such as the curvature of the annular shape of the layer, the layering height, and the layering width. The storage temperature extracting unit 24 obtains the program feature quantity "PA" for each movement command of the machining program 20. The storage temperature extracting unit 24 obtains, from the heat map K(tN1), the image feature quantity "PB", which is data on at least one of elements expressing the shape. The storage temperature extracting unit 24 collates the program feature quantity "PA" and the image feature quantity "PB" with each other to thereby bring the heat map K(tN1) into association with the movement path L(N1). For the movement path L(N2), also, the storage temperature extracting unit 24 brings the heat map K(tN2) into association with the movement path L(N2) in a manner similar to the movement path L(N1).

Figure 10:
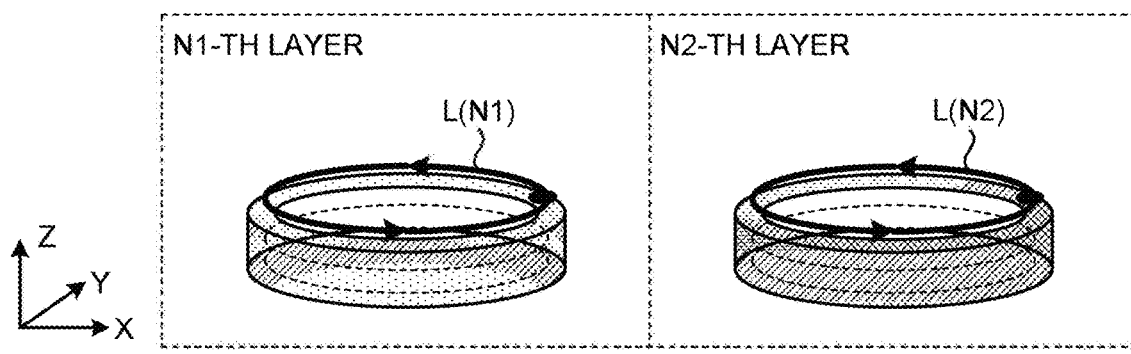
FIG. 10 is a diagram for explaining a result of extracting storage temperature by the storage temperature extracting unit of the numerical control device according to the first embodiment.

FIG. 10 is a diagram for explaining a result of extracting storage temperature by the storage temperature extracting unit of the numerical control device according to the first embodiment. FIG. 10 illustrates data of the extracted storage temperature in the same manner as the heat maps illustrated in FIG. 9.

The storage temperature extracting unit 24 extracts, from the heat map K(tN1), the storage temperature of an area including the movement path L(N1). The storage temperature extracting unit 24 extracts the storage temperature of an area in a certain range in the Z-axis direction in which the layers are stacked. The range of the peripheral area whose storage temperature is to be extracted is set by, for example, a user inputting a parameter. On the basis of the movement path L(N1) and process parameters such as the output value "P1", the supply amount "W1", and the speed "F1", the storage temperature extracting unit 24 may determine the range of the peripheral area whose storage temperature is to be extracted. The storage temperature extracting unit 24 outputs the data on the storage temperature extracted for the movement path L(N1), to the layering volume calculating unit 25.

For the movement path L(N2), also, the storage temperature extracting unit 24 extracts, from the heat map K(tN2), the storage temperature of an area including the movement path L(N2) in a manner similar to the movement path L(N1). The storage temperature extracting unit 24 outputs the data on the storage temperature extracted for the movement path L(N2), to the layering volume calculating unit 25.

(Layering volume calculating unit 25) The layering volume calculating unit 25 determines, on the basis of the data on the storage temperature extracted for the movement path L(i), a representative value of the storage temperature in each section included in the movement path L(i). The layering volume calculating unit 25 calculates a layering volume by using the determined representative value. In the first embodiment, the layering volume calculating unit 25 selects a representative value from four preset values "T1", "T2", "T3", and "T4" representing the storage temperatures for each section of the movement path L(i).

Figure 11:
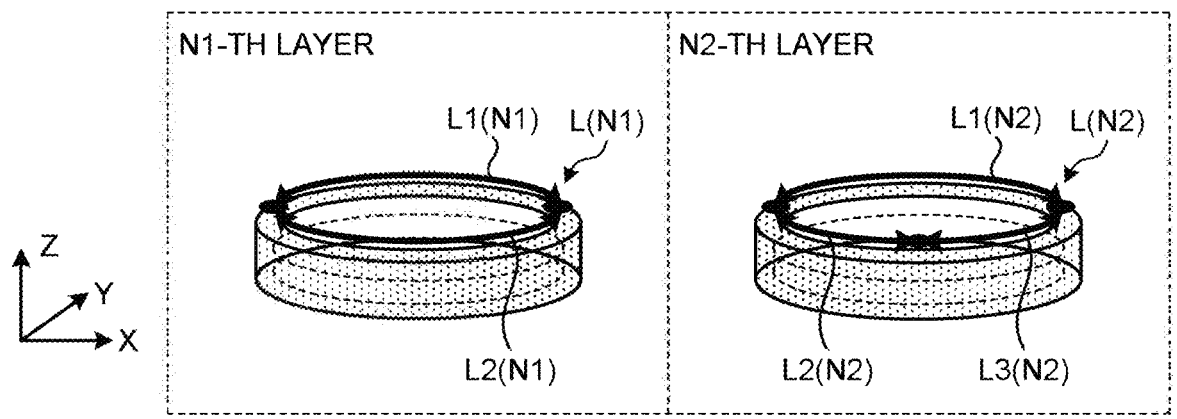
FIG. 11 is a first diagram for explaining determination of a representative value of storage temperature by a layering volume calculating unit of the numerical control device according to the first embodiment.
Figure 12:
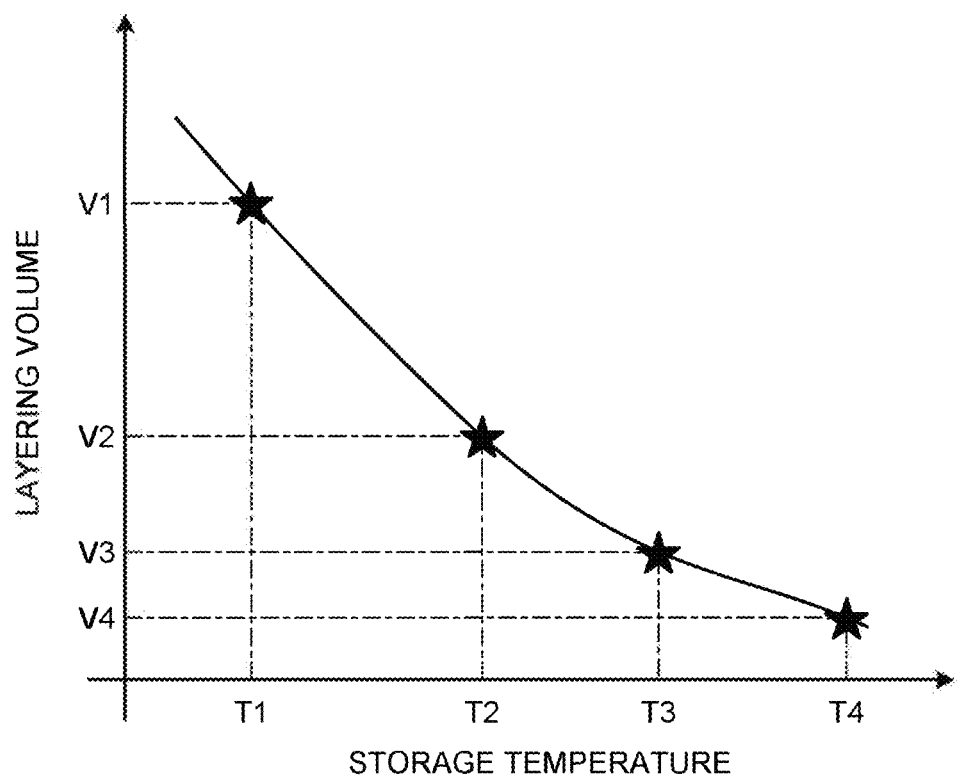
FIG. 12 is a second diagram for explaining determination of the representative value of the storage temperature by the layering volume calculating unit of the numerical control device according to the first embodiment.

FIG. 11 is a first diagram for explaining determination of the representative value of the storage temperature by the layering volume calculating unit of the numerical control device according to the first embodiment. FIG. 12 is a second diagram for explaining determination of the representative value of the storage temperature by the layering volume calculating unit of the numerical control device according to the first embodiment. In FIG. 12, "T1", "T2", "T3", and "T4" are plotted in the same graph as the graph illustrated in FIG. 6. As illustrated in FIG. 12, "T1", "T2", "T3", and "T4" satisfy the relation of T1<T2<T3<T4.

Two sections L1(N1) and L2(N1) for each movement command are included in the movement path L(N1). The layering volume calculating unit 25 determines a representative value in each of the section L1(N1) and the section L2(N1) of the movement path L(N1). When the value that is closest to the average storage temperature in the section L1(N1) is "T1" among "T1", "T2", "T3", and "T4", the layering volume calculating unit 25 determines that "T1" is the representative value in the section L1(N1). When the value that is closest to the average storage temperature in the section L2(N1) is "T2" among "T1", "T2", "T3", and "T4", the layering volume calculating unit 25 determines that "T2" is the representative value in the section L2 (N1).

Three sections L1(N2), L2(N2), and L3(N2) for each movement command are included in the movement path L(N2). The layering volume calculating unit 25 also determines a representative value in each of the section L1(N2), the section L2(N2), and the section L3(N2) in a manner similar to the movement path L(N1). Assume that the layering volume calculating unit 25 has determined that the representative values in the section L1(N2), the section L2(N2), and the section L3(N2) are "T2", "T3", and "T4", respectively. Note that a representative value of the storage temperature in each section of the movement path L(i) may be such a value as the maximum value of the storage temperature in the section, the minimum value of the storage temperature in the section, or the average value of the storage temperature in the section.

The layering volume calculating unit 25 calculates, on the basis of a preset relational expression, the volume of a layer that is to be formed on the workpiece by a single building for the movement path L(i). When each of "T1", "T2", "T3", and "T4" is substituted into the relational expression, the calculated layering volume is "V1", "V2", "V3", and "V4", respectively. "V1", "V2", "V3", and "V4" satisfy the relation of V1>V2>V3>V4. Because a relational expression indicating that the layering volume decreases as the storage temperature is higher is set, the layering volume calculating unit 25 decreases the volume of a layer that is to be formed by a single building at a part having a higher storage temperature on the movement path L(i). The NC device 1 can thus reduce variation in the time required for the material 5 to solidify on the movement path L(i).

In a section having a high storage temperature, the volume of a layer that is to be formed by a single building decreases, and the time required for building will increase as compared with other sections. The layering volume calculating unit 25 may estimate, on the basis of the calculated layering volume, the time required for building in each section, and change the order of building so that a section requiring a longer time than a certain time for building will be subjected to building later. That is, the layering volume calculating unit 25 changes the order of building in each of sections included in a movement path, on the basis of the layering volume. The NC device 1 can thus shorten the time required for layer formation.

Figure 13:
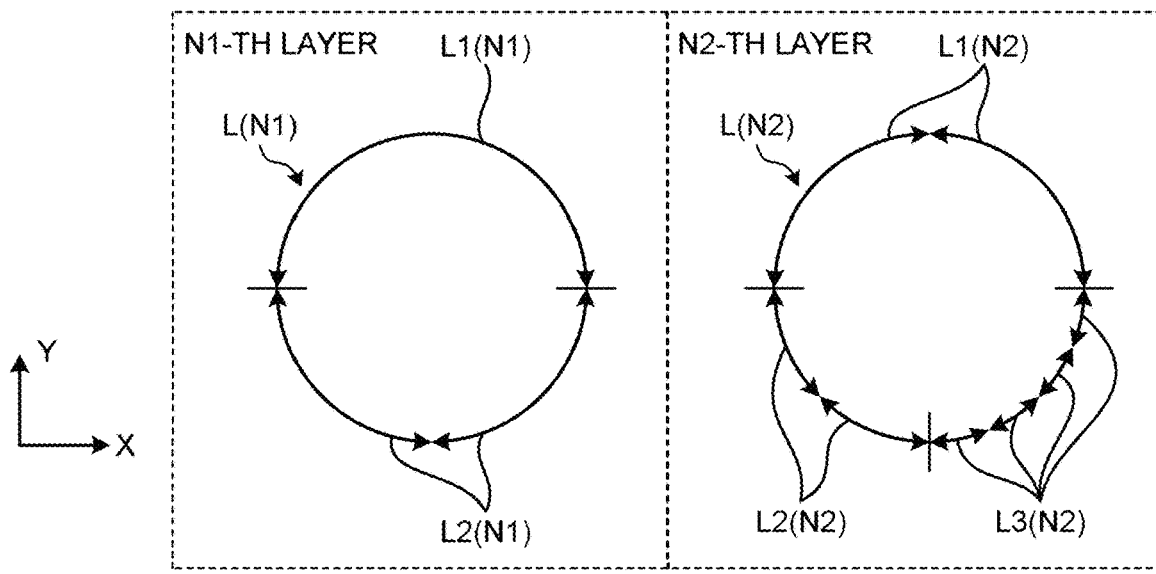
FIG. 13 is a diagram illustrating an example of a result of calculation of a layering volume by the layering volume calculating unit of the numerical control device according to the first embodiment.

FIG. 13 is a diagram illustrating an example of a result of calculation of a layering volume by the layering volume calculating unit of the numerical control device according to the first embodiment. The following description is based on the assumption that V2=(V1)/2, V3=(V1)/4, and V4=(V1)/8 hold true.

"T1" is substituted into the relational expression to thereby provide the layering volume "V1" in the section L1(N1) of the movement path L(N1). "T2" is substituted into the relational expression to thereby provide the layering volume "V2" in the section L2(N1) of the movement path L(N1). Thus, the NC device 1 causes the additive manufacturing apparatus 100 to form a layering volume of "V1" per building in the section L1(N1). The NC device 1 causes the additive manufacturing apparatus 100 to form a layering volume of "V2" per building in the section L2 (N1).

"T2" is substituted into the relational expression to thereby provide the layering volume "V2" in the section L1(N2) of the movement path L(N2). "T3" is substituted into the relational expression to thereby provide the layering volume "V3" in the section L2(N2) of the movement path L(N2). "T4" is substituted into the relational expression to thereby provide the layering volume "V4" in the section L3(N2) of the movement path L(N2). Thus, the NC device 1 causes the additive manufacturing apparatus 100 to form a layering volume of "V2" per building in the section L1(N2). The NC device 1 causes the additive manufacturing apparatus 100 to form a layering volume of "V3" per building in the section L2 (N2). The NC device 1 causes the additive manufacturing apparatus 100 to form a layering volume of "V4" per building in the section L3(N2).

The layering volume calculating unit 25 outputs the results of calculation of the layering volumes for the movement path L(N1) and the movement path L(N2), to the layering shape changing unit 26. In the first embodiment, the layering volume calculating unit 25 calculates the layering volumes together for each movement path. The layering volume calculating unit 25 may calculate the layering volumes in each section in a movement path. In this case, the layering volume calculating unit 25 may calculate the layering volumes in parallel to processes performed by the layering shape changing unit 26 and the command value generating unit 27.

(Layering Shape Changing Unit 26)

The layering shape changing unit 26 changes the layering length depending on the layering volume in each section included in the movement path L(i) to change the layering shape. The layering shape changing unit 26 changes the layering length by calculating the layering length on the basis of the layering volume calculated by the layering volume calculating unit 25. In this process, the layering shape changing unit 26 calculates the layering length "l" by using formula (2) below on the assumption that the cross-sectional area of the layer is a quadrangle. The layering height "h" and the layering width "d" are assigned values set in the layering condition data "D1".

[Formula 2]

$$l = \frac{V}{h \times d} \qquad (2)$$

The layering shape changing unit 26 obtains the layering length l(i) in each section of the movement path L(i). The layering shape changing unit 26 obtains "l1" and "l2" for the movement path L(N1) illustrated in FIG. 13. "l1" is the layering length in the section L1(N1), and "l2" is the layering length in the section L2 (N1). "l2" is half of "l1".

The layering shape changing unit 26 obtains "l1'", "l2'", and "l3'" for the movement path L(N2) illustrated in FIG. 13. "l1'" is the layering length in the section L1(N2), "l2'" is the layering length in the section L2(N2), and "l3'" is the layering length in the section L3(N2). "l1'" is half of "l1" and equal to "l2". "l2'" is half of "l1'", that is, one-fourth of "l1". "l3'" is one-fourth of "l1'", that is, one-eighth of "l1". The layering shape changing unit 26 changes the layering shape by thus changing the layering length l(i) depending on the layering volume. The layering shape changing unit 26 outputs the result of calculation of the layering length l(i) to the command value generating unit 27.

(Command Value Generating Unit 27)

The command value generating unit 27 generates a position command, an output command, and a supply command on the basis of the layering length l(i) input from the layering shape changing unit 26 and the speed "F1" input from the program analyzing unit 23. The command value generating unit 27 generates a speed Fc(i,t) of the irradiation position on the basis of the layering length l(i) and the speed value "F1" on the movement path L(i). The speed Fc(i,t) is a moving speed of the irradiation position at a given time "t" on the movement path L(i). Specific processes performed by the command value generating unit 27 include an acceleration/deceleration process of generating a speed waveform for acceleration or deceleration at a preset acceleration rate, and a smoothing process of smoothing the generated speed waveform. The smoothing process is also called a moving average filtering process.

Figure 14:
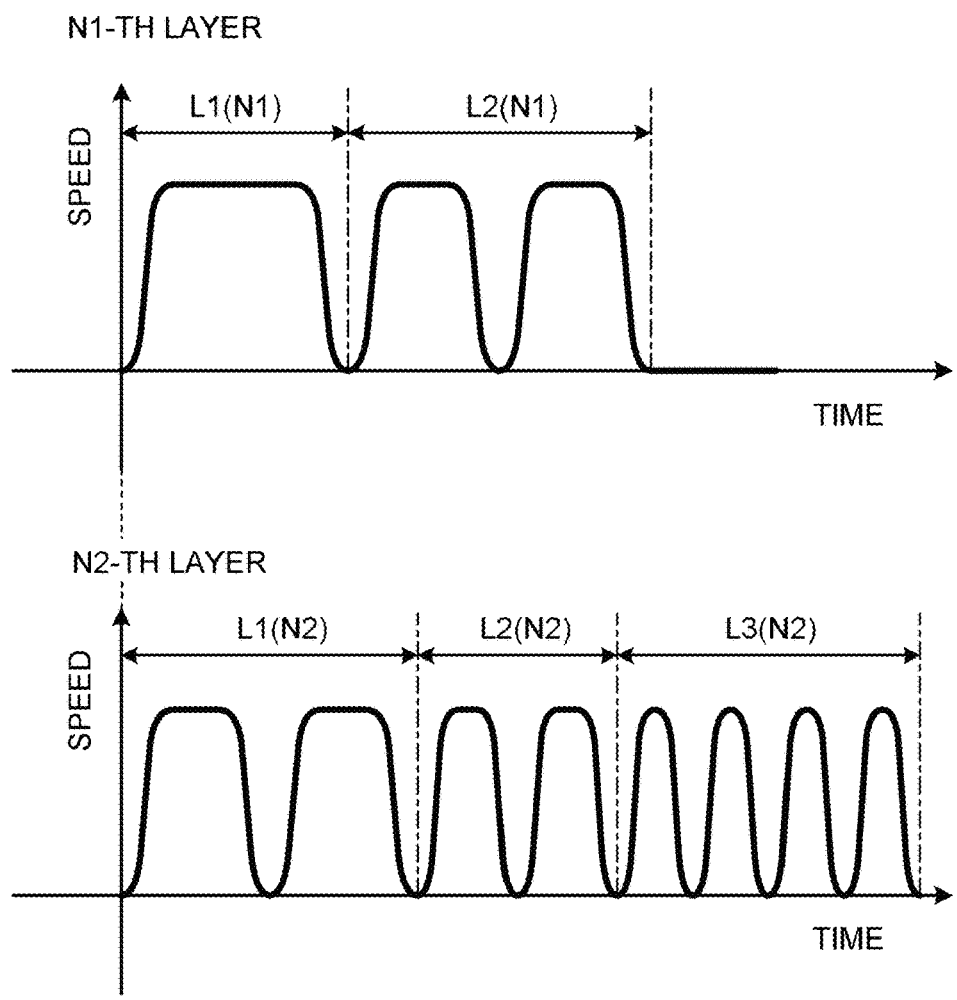
FIG. 14 is a graph illustrating examples of speed waveforms generated by a command value generating unit of the numerical control device according to the first embodiment.

FIG. 14 is a graph illustrating examples of speed waveforms generated by the command value generating unit of the numerical control device according to the first embodiment. FIG. 14 illustrates a speed waveform of a speed Fc(N1,t) in forming the N1-th layer, and a speed waveform of a speed Fc(N2,t) in forming the N2-th layer.

The additive manufacturing apparatus 100 moves the machining head 8 on the movement paths L(N1) and L(N2) in accordance with the speed waveforms illustrated in FIG. 14. The additive manufacturing apparatus 100 thus performs building once to thereby provide the layering length of "l1" per building in the section L1(N1), and performs building twice to thereby provide the layering length of "l2" per building in the section L2 (N1). In addition, the additive manufacturing apparatus 100 performs building twice to thereby provide the layering length of "l1'" per building in the section L1(N2), performs building twice to thereby provide the layering length of "l2'" per building in the section L2(N2), and performs building four times to thereby provide the layering length of "l3'" per building in the section L3(N2).

The command value generating unit 27 obtains coordinates of interpolated points through an interpolation process. An interpolated point indicates a position of the machining head 8 at every unit time when the machining head 8 is moved at the speed Fc(i,t) after the smoothing process. The command value generating unit 27 outputs a command position that is an interpolated point to the head drive unit 12 at every unit time. The NC device 1 thus controls the movement of the machining head 8 so that target positions are irradiated with the laser beam.

The command value generating unit 27 generates an output command, which is a command depending on the condition of laser beam output. The command value generating unit 27 generates the output command, i.e., an output value Pc(i,t) on the basis of the output value "P1" of the laser beam. The output value Pc(i,t) is an output value of the laser beam at a given time "t" on the movement path L(i).

The command value generating unit 27 generates a supply command, which is a command depending on the condition of the amount of supply of the material 5. The command value generating unit 27 generates the supply command, i.e., a supply amount Wc(i,t) on the basis of the supply amount "W1". The supply amount Wc(i,t) is an amount of supply of the material 5 at a given time "t" on the movement path L(i).

The command value generating unit 27 adjusts the output value Pc(i,t) depending on the speed Fc(i,t) in accordance with formula (3) below.

[Formula 3]

$$Pc(i, t) = \frac{Fc(i, t)}{F} P \qquad (3)$$

The command value generating unit 27 adjusts the supply amount Wc(i,t) depending on the speed Fc(i,t) in accordance with formula (4) below.

[Formula 4]

$$Pc(i, t) = \frac{Fc(i, t)}{F} P \qquad (4)$$

In formulas (3) and (4), "P" represents the output value described in the layering condition data, "W" represents the supply amount described in the layering condition data, and "F" represents the speed described in the layering condition data. The command value generating unit 27 outputs the output value Pc(i,t) to the laser oscillator 2. The NC device 1 thus controls the laser beam output. The command value generating unit 27 outputs the supply amount Wc(i,t) to the material supplying device 4. The NC device 1 thus controls the amount of supply of the material 5.

According to the first embodiment, the NC device 1 calculates, on the basis of the storage temperature of the workpiece, a layering volume that can reduce the variation in the time required for the material 5 to solidify, and changes the layering shape on the basis of the calculated layering volume. The NC device 1 changes the layering shape so that the layering volume is decreased as the storage temperature is higher. Because the layering height and the layering width are both set in the layering condition data, the NC device 1 decreases the layering volume by shortening the layering length. The NC device 1 causes the additive manufacturing apparatus 100 to perform building a plurality of times in a section for which the layering length is shortened. The NC device 1 can reduce the amount of heat transferred from the material 5 to the workpiece and curb increase in the storage temperature, by reducing the layering volume of a part having a high storage temperature.

The NC device 1 reduces the variation in the time required for the material 5 to solidify, thereby making it possible to reduce a loss of shape caused due to a long time required for the material 5 to solidify. The NC device 1, which can reduce the loss of shape of the object, enables the additive manufacturing apparatus 100 to perform machining with high machining accuracy. As a result, the NC device 1 produces an advantageous effect of enabling the additive manufacturing apparatus 100 to perform machining with high machining accuracy.

Second Embodiment

Figure 15:
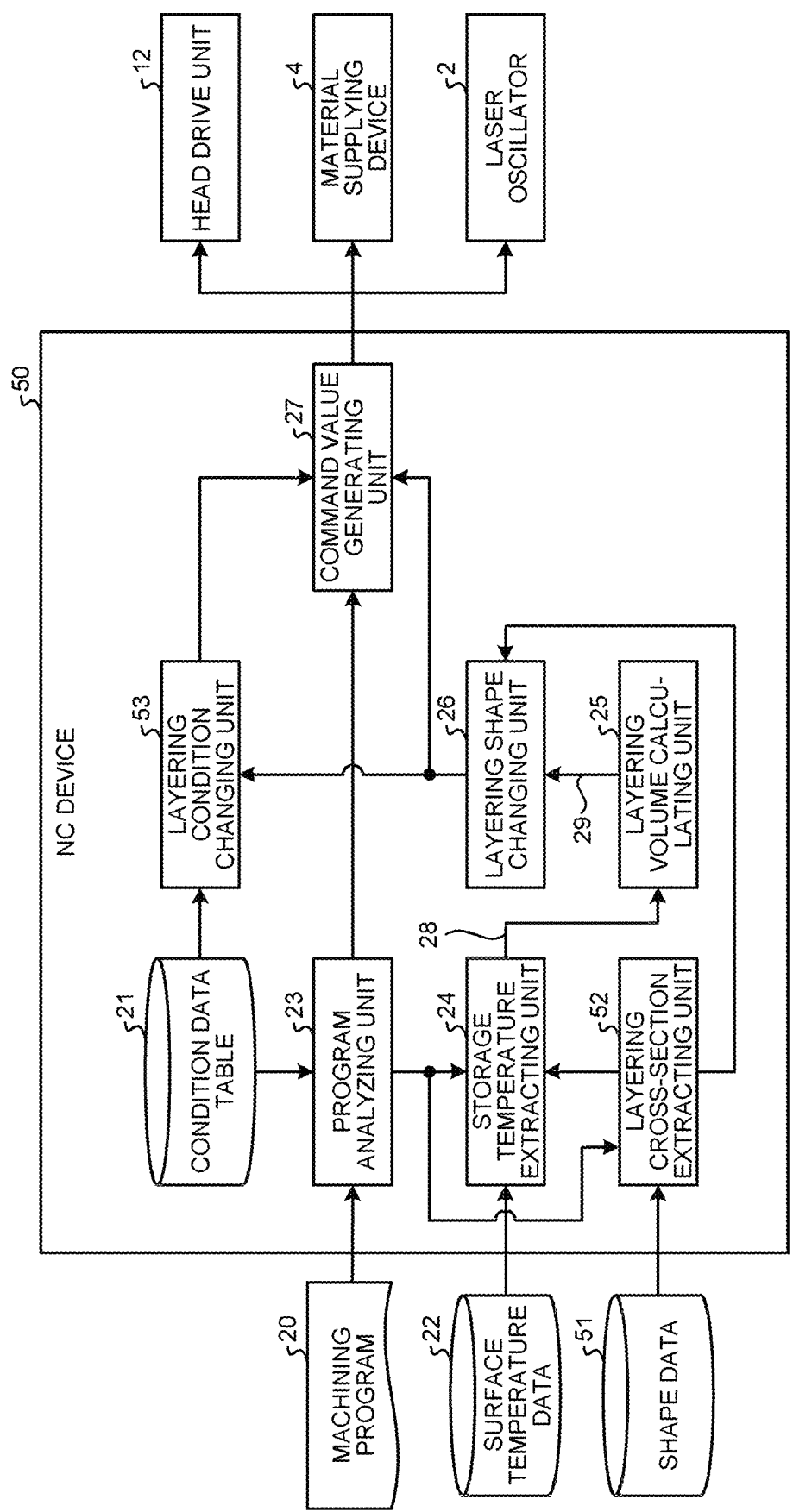
FIG. 15 is a diagram illustrating a functional configuration of a numerical control device according to a second embodiment of the present invention.

FIG. 15 is a diagram illustrating a functional configuration of a numerical control device according to a second embodiment of the present invention. An NC device 50 according to the second embodiment includes a layering cross-section extracting unit 52 and a layering condition changing unit 53 in addition to the configuration of the NC device 1 illustrated in FIG. 2. In the second embodiment, the same components as those in the first embodiment described above will be represented by the same reference numerals, and the second embodiment differs from the first embodiment in respects as will be mainly described.

In addition to the machining program 20 and the surface temperature data 22, shape data 51 is input to the NC device 50. The shape data 51 is data indicating the shape of an object 15. A device that detects the shape of the object 15 is installed in the additive manufacturing apparatus 100. The shape data 51 is input from the device to the NC device 50. An example of the device is a camera that images the modeled object 15. In FIG. 15, the device that detects the shape of the layering cross-section is not illustrated.

The program analyzing unit 23 outputs data indicating a movement path to the command value generating unit 27, the storage temperature extracting unit 24, and the layering cross-section extracting unit 52. The layering cross-section extracting unit 52 extracts, from the shape data 51, layering cross-section data in an area including the movement path on the workpiece. The layering cross-section data is data indicating the shape of a layering cross section. The layering cross section, which is a cross section of a layer forming the object 15, is perpendicular to the length direction of the layer. The layering cross-section data includes a value of the layering height and a value of the layering width. The layering cross-section extracting unit 52 outputs the layering cross-section data to the storage temperature extracting unit 24 and the layering shape changing unit 26.

The layering shape changing unit 26 changes at least one of the layering height, the layering width, and the layering length to thereby change the shape of the layer. The layering shape changing unit 26 outputs data indicating the changed shape of the layer, to the command value generating unit 27 and the layering condition changing unit 53.

The layering condition changing unit 53 changes at least one of conditions including the speed of the irradiation position, the laser beam output, and the amount of supply of the material 5. The layering condition changing unit 53 outputs the data indicating the changed condition to the command value generating unit 27.

The respective functional units of the NC device 50 are implemented by executing programs for performing a method for controlling the additive manufacturing apparatus 100 by hardware. The layering cross-section extracting unit 52 and the layering condition changing unit 53 are implemented with use of the CPU 31 illustrated in FIG. 3.

Figure 16:
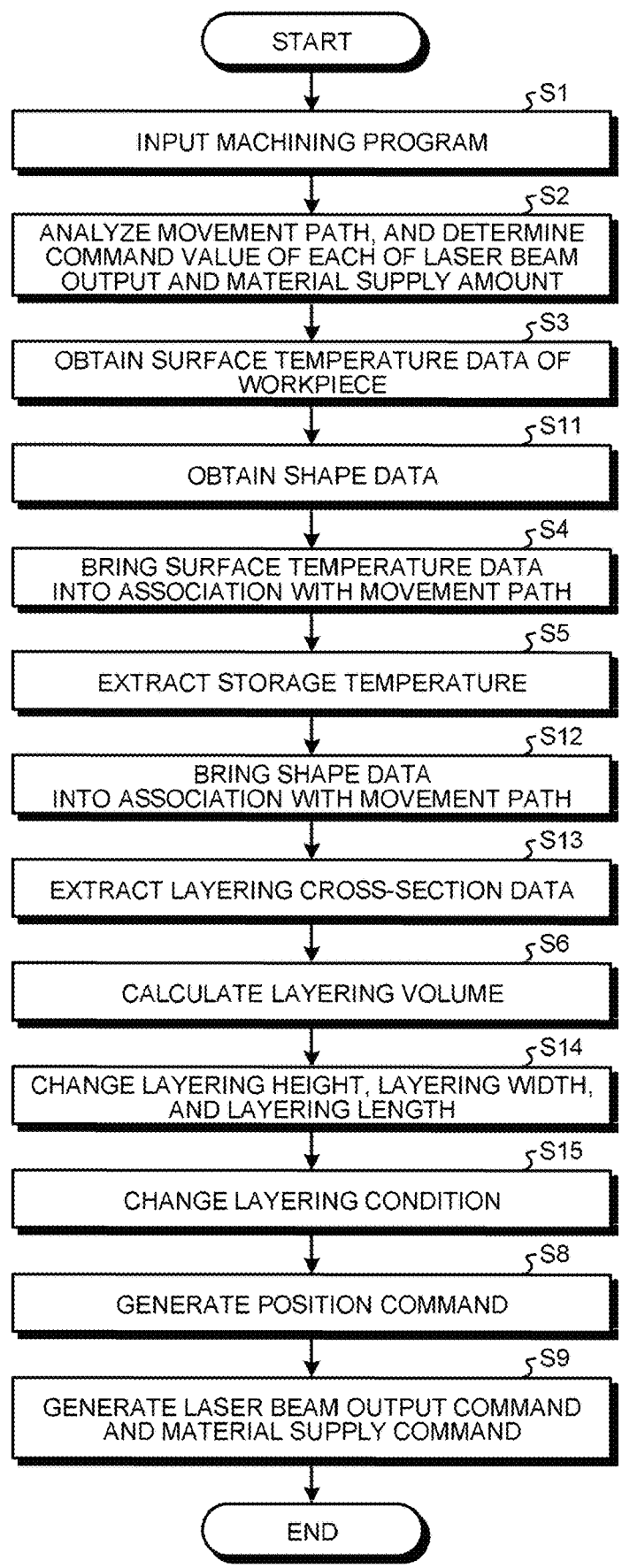
FIG. 16 is a flowchart illustrating procedures of operation performed by the numerical control device according to the second embodiment.

Next, the operation of the NC device 50 will be explained. FIG. 16 is a flowchart illustrating procedures of operation performed by the numerical control device according to the second embodiment. The procedures in steps S1 to S3 are similar to those in FIG. 4. In step S11 after step S3, the layering cross-section extracting unit 52 obtains the shape data 51. The procedures in steps S4 and S5 are similar to those in FIG. 4.

In step S12 after step S5, the layering cross-section extracting unit 52 brings the shape data 51 into association with the movement path of the supply position on the workpiece. The layering cross-section extracting unit 52 brings the shape data 51 into association with the movement path to thereby identify the shape of the object 15 in the program coordinate system. After performing step S12, the NC device 50 advances the procedure to step S13.

In step S13, the layering cross-section extracting unit 52 extracts, from the shape data 51, layering cross-section data in an area including the movement path. The layering cross-section extracting unit 52 extracts the layering cross-section data in a section of a movement path indicated by a pre-read movement command and a peripheral area of the movement path in the section. The layering cross-section extracting unit 52 outputs the extracted layering cross-section data to the storage temperature extracting unit 24 and the layering shape changing unit 26. The layering cross-section data extracted by the layering cross-section extracting unit 52 is measured values based on the shape data 51 of the modeled object 15. The layering cross-section data are not limited to measured values, and may be estimated values. An estimation formula used for calculating an estimated value may be an estimation formula created on the basis of the movement path of the irradiation position, and process parameters such as the laser beam output, the amount of supply of the material 5, and the type of the material 5. After performing step S13, the NC device 50 advances the procedure to step S6. The procedure in step S6 is similar to that in FIG. 4.

In step S14 after step S6, the layering shape changing unit 26 changes a layering height, a layering width, and a layering length. The layering shape changing unit 26 changes the layering height and the layering width on the basis of the layering cross-section data extracted in step S13. The layering shape changing unit 26 changes the layering length on the basis of the layering volume calculated in step S6 and the changed layering height and layering width. The calculation of the layering height, the layering width, and the layering length performed by the layering shape changing unit 26 will be described later. The layering shape changing unit 26 outputs values that are the results of calculation of the layering height and the layering width, to the layering condition changing unit 53. The layering shape changing unit 26 outputs a value that is the result of calculation of the layering length, to the command value generating unit 27. After performing step S14, the NC device 50 advances the procedure to step S15.

In step S15, the layering condition changing unit 53 reads one piece of layering condition data from among the layering condition data held in the condition data table 21. The layering condition changing unit 53 selects layering condition data including the same combination as a combination of the layering height and the layering width that are the calculation results in step S14, reads the selected layering condition data, and changes the layering condition. On the basis of the read layering condition data, the layering condition changing unit 53 outputs the output value of the laser beam, the amount of supply of the material 5, and the speed at which the irradiation position is to be moved to the command value generating unit 27. After performing step S15, the NC device 50 advances the procedure to step S8. The procedures in steps S8 and S9 are similar to those in FIG. 4. As a result of performing step S9, the NC device 50 terminates the operation according to the procedures illustrated in FIG. 16.

Next, the operations of the respective components of the NC device 50 will be explained in detail.

(Layering Cross-Section Extracting Unit 52)

The layering cross-section extracting unit 52 obtains the shape data 51 of the object 15. The shape data 51 is static image data obtained by imaging the object 15 at a certain time. The shape data 51 may be part of video data. The shape data 51 captured by a plurality of cameras may be input to the layering cross-section extracting unit 52. The camera are installed at positions in directions different from each other from the object 15. The layering cross-section extracting unit 52 brings the shape data 51 into association with the movement path L(i), and extracts the layering cross-section data on the movement path L(i) and the peripheral area of the movement path L(i).

Figures 17, 18:
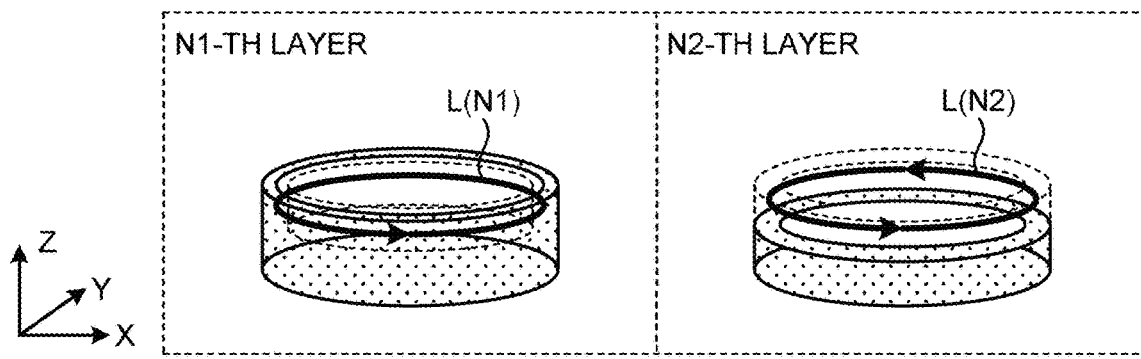
FIG. 17 is a diagram for explaining a result of extracting layering cross-section data by a layering cross-section extracting unit of the numerical control device according to the second embodiment.
FIG. 18 is a table illustrating an example of the content of layering condition data stored in a condition data table of the numerical control device according to the second embodiment.

FIG. 17 is a diagram for explaining a result of extracting layering cross-section data by the layering cross-section extracting unit of the numerical control device according to the second embodiment. An N1-th layer and an N2-th layer are two given layers in a manner similar to the first embodiment. FIG. 17 illustrates an example of a result of extracting the layering cross-section data in an area including the movement path L(N1), and an example of a result of extracting the layering cross-section data in an area including the movement path L(N2). In FIG. 17, the shape of a layer expressed by the extracted layering cross-section data is illustrated by solid lines, and the shape of the N1-th layer and the shape of the N2-th layer are illustrated by broken lines.

The range of the peripheral area whose layering cross-section data is to be extracted is set by, for example, a user inputting a parameter. On the basis of the movement paths L(N1) and L(N2) and process parameters such as the output value "P1", the supply amount "W1", and the speed "F1", the storage temperature extracting unit 24 may determine the ranges of the peripheral areas whose layering cross-section data is to be extracted. The layering cross-section extracting unit 52 outputs the layering cross-section data extracted for the movement paths L(N1) and L(N2), to the layering shape changing unit 26.

(Layering Shape Changing Unit 26)

The layering shape changing unit 26 changes the layering height h(i) and the layering width d(i) on the movement path L(i) on the basis of the extracted layering cross-section data. In addition, the layering shape changing unit 26 changes the layering length l(i) on the movement path L(i) depending on the layering volume, the layering height h(i), and the layering width d(i).

Assume that the layering height is "2h" and the layering width is "d/2" in the layering cross-section data extracted for the movement path L(N1). In this case, the layering shape changing unit 26 changes the layering height h(N1) from "h" to "2h". The layering shape changing unit 26 changes the layering width d(N1) from "d" to "d/2". Assume that the layering height is "2h" and the layering width is "d" in the layering cross-section data extracted for the movement path L(N2). In this case, the layering shape changing unit 26 changes the layering height h(N2) from "h" to "2h". The layering shape changing unit 26 keeps the layering width d(N2) unchanged as "d".

Assume that the movement path L(N1) includes two sections L1(N1) and L2(N1) as in the first embodiment illustrated in FIGS. 13 and 14. Also, assume that the movement path L(N2) includes three sections L1(N2), L2(N2), and L3(N2). In addition, assume that as in the first embodiment, the layering volume calculating unit 25 calculates the layering volumes in the section L1(N1) and the section L2(N2) to provide "V1" and "V2", respectively. Further, assume that the layering volume calculating unit 25 calculates the layering volumes in the section L1(N2), the section L2(N2), and the section L3(N2) to provide "V2", "V3", and "V4", respectively. Furthermore, assume that, as in the first embodiment, V2=(V1)/2, V3=(V1)/4, and V4=(V1)/8 hold true.

The layering shape changing unit 26 calculates the layering length "l" by using formula (2) on the assumption that the three-dimensional shape of the layer is a rectangular parallelepiped. In formula (2), the layering height "h" and the layering width "d" are assigned values calculated by the layering shape changing unit 26.

The layering shape changing unit 26 obtains "l4" and "l5" in the movement path L(N1) illustrated in FIG. 13. "l4" is the layering length in the section L1(N1), and "l5" is the layering length in the section L2 (N1). "l4" is equal to "l1", which is the layering length in the section L1(N1) in the first embodiment. "l5" is half of "l4".

The layering shape changing unit 26 obtains "l4'" and "l5'" in the movement path L(N2) illustrated in FIG. 13. "l4'" is the layering length in the section L1(N2), "l5'" is the layering length in the section L2(N2), and "l6'" is the layering length in the section L3(N2). "l4'" is one-fourth of "l4". "l5'" is half of "l4'", that is, one-eighth of "l4". "l6'" is one-fourth of "l4'", that is, one-sixteenth of "l4".

The layering shape changing unit 26 changes the layering length l(i) depending on the layering volume, the layering height h(i), and the layering width d(i) in the above manner to thereby change the layering shape. The layering shape changing unit 26 outputs the result of calculation of the layering height h(i) and the result of the calculation of the layering width d(i) to the layering condition changing unit 53. The layering shape changing unit 26 outputs the result of calculation of the layering length l(i) to the command value generating unit 27.

(Layering Condition Changing Unit 53)

The layering condition changing unit 53 changes the speed "F" of the irradiation position, the output value "P" of the laser beam, and the amount "W" of supply of the material 5 on the basis of the layering height h(i) and the layering width d(i) input from the layering shape changing unit 26.

FIG. 18 is a table illustrating an example of the content of layering condition data stored in a condition data table of the numerical control device according to the second embodiment. In FIG. 18, values of the layering height, the layering width, the speed of the irradiation position, the amount of supply of the material 5, and the output value of the laser beam are described for each of four layering condition data "D1", "D2", "D3", and "D4" stored in the condition data table 21.

Because the calculated layering height h(N1) is "2h" and the calculated layering width d(N1) is "d/2", the layering condition changing unit 53 selects the layering condition data "D2" in which the layering height is "2h" and the layering width is "d/2" for the movement path L(N1) As a result of changing the layering condition data from "D1" to "D2", the layering condition changing unit 53 changes the speed from "F1" to "F2", the output value from "P1" to "P2", and the supply amount from "W1" to "W2". The layering condition changing unit 53 outputs the speed "F2", the output value "P2", and the supply amount "W2" to the command value generating unit 27.

Because the calculated layering height h(N2) is "2h" and the calculated layering width d(N2) is "d", the layering condition changing unit 53 selects the layering condition data "D3" in which the layering height is "2h" and the layering width is "d" for the movement path L(N2). As a result of changing the layering condition data from "D1" to "D3", the layering condition changing unit 53 changes the speed from "F1" to "F3", the output value from "P1" to "P3", and the supply amount from "W1" to "W3". The layering condition changing unit 53 outputs the speed "F3", the output value "P3", and the supply amount "W3" to the command value generating unit 27.

According to the second embodiment, the NC device 50 changes at least one of the layering height, the layering width, and the layering length to thereby change the layering shape. The NC device 50 change the layering shape so that the layering volume decreases as the storage temperature is higher, to reduce the variation in the time required for the material 5 to solidify. The NC device 50, which can reduce the loss of shape of the object 15, enables the additive manufacturing apparatus 100 to perform machining with high machining accuracy. As a result, the NC device 50 produces an advantageous effect of enabling the additive manufacturing apparatus 100 to perform machining with high machining accuracy. In addition, the NC device 50, which determines the layering height and the layering width on the basis of the layering cross-section data for the area including the movement path on the workpiece, enables the additive manufacturing apparatus 100 to perform modeling with high accuracy.

Third Embodiment

Figure 19:
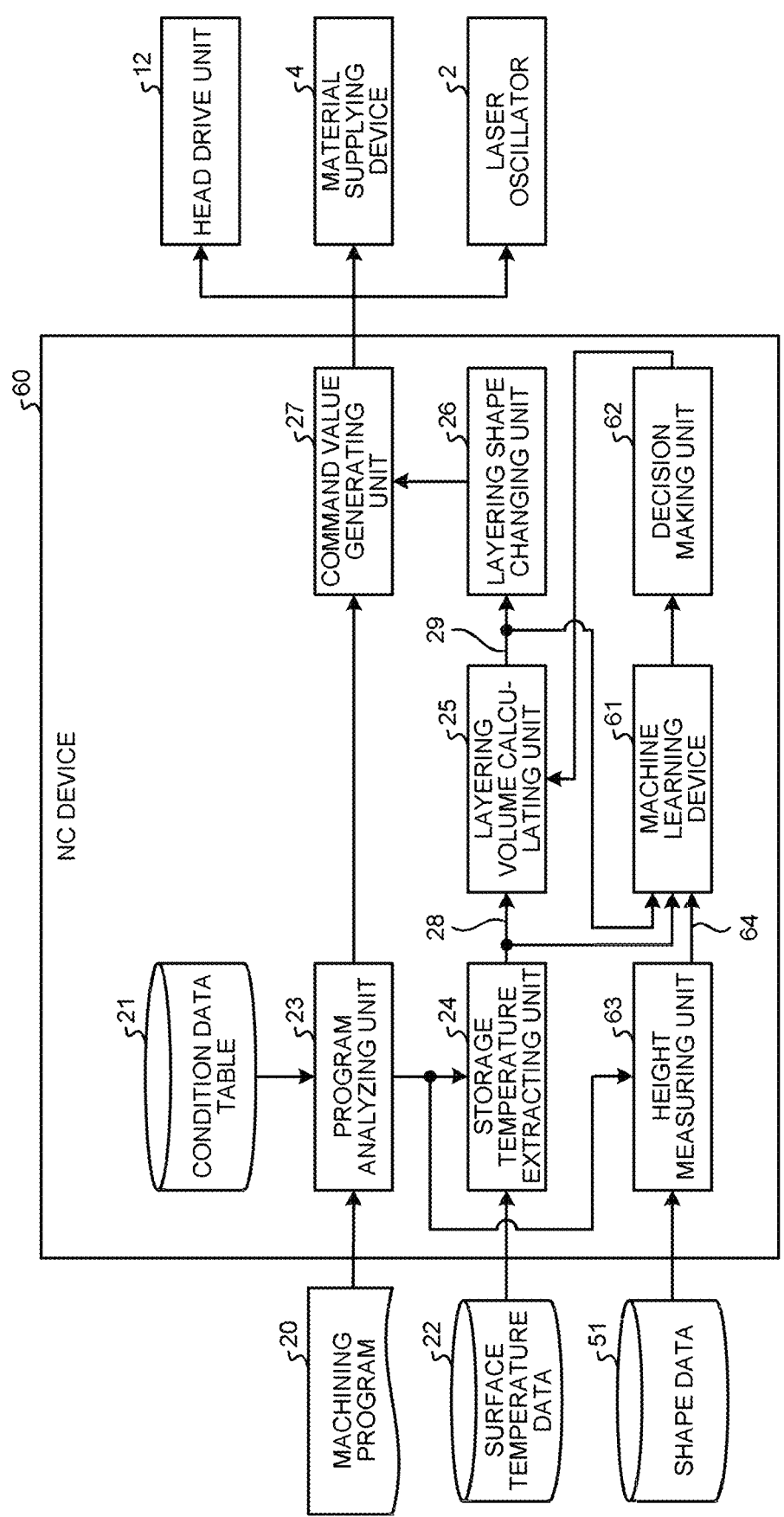
FIG. 19 is a diagram illustrating a functional configuration of a numerical control device according to a third embodiment of the present invention.

FIG. 19 is a diagram illustrating a functional configuration of a numerical control device according to a third embodiment of the present invention. In an NC device 60 according to the third embodiment, the relation between the storage temperature and the layering volume is determined by machine learning. The NC device 60 includes a functional configuration for machine learning in addition to the configuration of the NC device 1 according to the first embodiment. In the third embodiment, the same components as those in the first and second embodiments described above will be represented by the same reference numerals, and the third embodiment differs from the first and second embodiments in respects as will be mainly described.

The NC device 60 includes a machine learning device 61, a decision making unit 62, and a height measuring unit 63 in addition to the functional configuration of the NC device 1 according to the first embodiment. The machine learning device 61 learns the relation between the storage temperature and the layering volume. The decision making unit 62 determines the relation between the storage temperature and the layering volume illustrated in FIG. 6 on the basis of a result of learning by the machine learning device 61.

The shape data 51 is input to the NC device 60 as in the second embodiment. The height measuring unit 63 measures the layering height on the basis of the shape data 51. The program analyzing unit 23 outputs data indicating a movement path, to the height measuring unit 63. The height measuring unit 63 measures the layering height in an area including the movement path on the workpiece to thereby output height data 64 to the machine learning device 61. The height data 64 is data indicating the height of a layer formed on the workpiece.

The storage temperature extracting unit 24 outputs the storage temperature data 28 to the machine learning device 61. The layering volume calculating unit 25 outputs the layering volume data 29 to the machine learning device 61. The storage temperature data 28, the layering volume data 29, and the height data 64 are input to the machine learning device 61.

Figure 20:
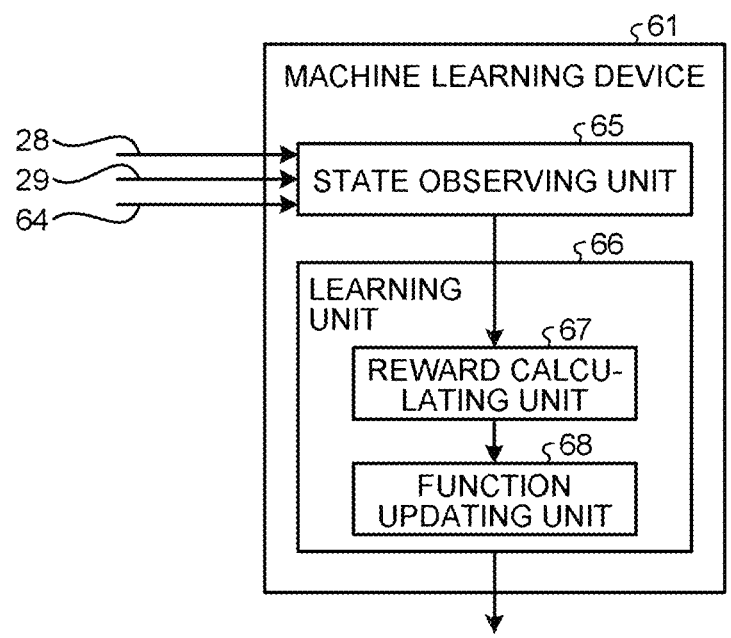
FIG. 20 is a block diagram illustrating a functional configuration of a machine learning device of the numerical control device illustrated in FIG. 19.

FIG. 20 is a block diagram illustrating a functional configuration of the machine learning device of the numerical control device illustrated in FIG. 19. The machine learning device 61 includes a state observing unit 65, and a learning unit 66. The storage temperature data 28, the layering volume data 29, and the height data 64 are input to the state observing unit 65. The state observing unit 65 observes, as state variables, the storage temperature, the layering volume calculated by the layering volume calculating unit 25, and the height data 64 on the height of the layer formed on the workpiece. The learning unit 66 learns the relation between the storage temperature and the layering volume in accordance with a training data set created on the basis of the state variables.

Any learning algorithm may be used by the learning unit 66. The description will be made giving an example in which reinforcement learning is applied to the learning algorithm. In reinforcement learning, a subject of actions, which is an agent in an environment, observes a current state, and determines an action that should be taken. The agent obtains a reward from the environment as a result of selecting an action, and learns measures that can obtain the most rewards through a series of actions. Q-learning, TD-learning, and the like are known as typical techniques of reinforcement learning. For example, in the case of Q-learning, an action value table, which is a typical formula for updating an action value function $Q(s,a)$, is expressed by formula (5) below. The action value function $Q(s,a)$ represents an action value $Q$, which is a value of an action of selecting an action "a" in an environment "s".

[Formula 5]

$$Q(s_t,a_t) \leftarrow Q(s_t,a_t) + a(r_{t+1} + \gamma \max_a Q(s_{t+1},a_t) - Q(s_t,a_t)) \quad (5)$$

In formula (5), "$s_{t+1}$" represents the environment at time "t". "$a_t$" represents an action at time "t". The "$a_t$" changes the environment to "$s_{t+1}$". "$r_{t+1}$" represents a reward given as a result of the change in the environment. "γ" represents a discount rate. "a" represents a learning coefficient. In a case where Q-learning is applied, the value of the layering volume is an action "$a_t$".

The updating formula expressed by formula (5) increases an action value Q when the action value of the best action "a" at time "t+1" is larger than the action value Q of an action "a" performed at time "t", or decreases the action value Q in the contrary case. In other words, the action value function Q(s, a) is updated so that the action value Q of the action "a" at time "t" becomes closer to the best action value at time "t+1". As a result, the best action value in an environment sequentially is propagated to action values in previous environments.

The learning unit 66 includes a reward calculating unit 67 and a function updating unit 68. The reward calculating unit 67 calculates a reward on the basis of the state variables. In accordance with the reward calculated by the reward calculating unit 67, the function updating unit 68 updates a function for determining the relation between the storage temperature and the layering volume.

The reward calculating unit 67 calculates a reward "r" on the basis of a result of comparison between the variation in the height of a formed layer and a threshold. For example, when the variation in the height of the formed layer becomes equal to or smaller than the threshold as a result of a change in the value of the layering volume relative to a storage temperature, the reward calculating unit 67 increases the reward "r". The reward calculating unit 67 increases the reward "r" by giving "1" that is a value of the reward. Note that the value of the reward is not limited to "1". When the variation of the height of the formed layer becomes larger than the threshold as a result of a change in the value of the layering volume relative to a storage temperature, the reward calculating unit 67 decreases the reward "r". The reward calculating unit 67 decreases the reward "r" by giving "−1" that is a value of the reward. Note that the value of the reward is not limited to "−1".

In accordance with the reward calculated by the reward calculating unit 67, the function updating unit 68 updates a function for determining the relation between the storage temperature and the layering volume. The function can be updated by update on an action value table, for example, in accordance with the training data set. The action value table is a data set storing an action and an action value thereof in association with each other in a form of a table. In the case of Q-learning, for example, the action value function $Q(s_t, a_t)$ expressed by formula (5) is used as a function for calculating parameter values to be used for a relational expression of the storage temperature and the layering volume.

Figure 21:
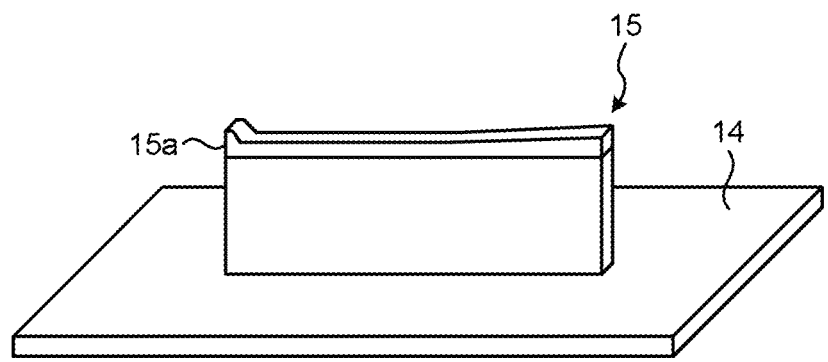
FIG. 21 is a diagram for explaining a case where a reward calculated by a reward calculating unit of the machine learning device illustrated in FIG. 20 is decreased.
Figure 22:
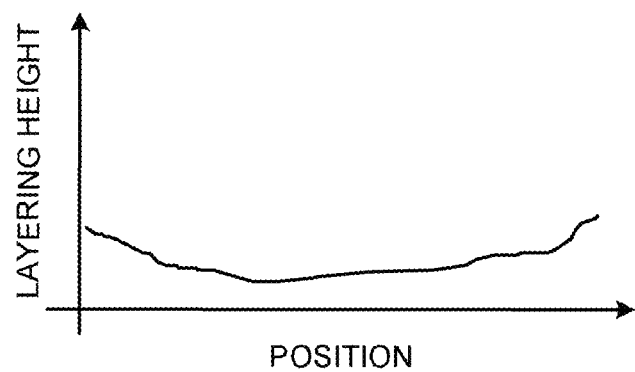
FIG. 22 is a graph for explaining the case where the reward calculated by the reward calculating unit of the machine learning device illustrated in FIG. 20 is decreased.
Figure 23:
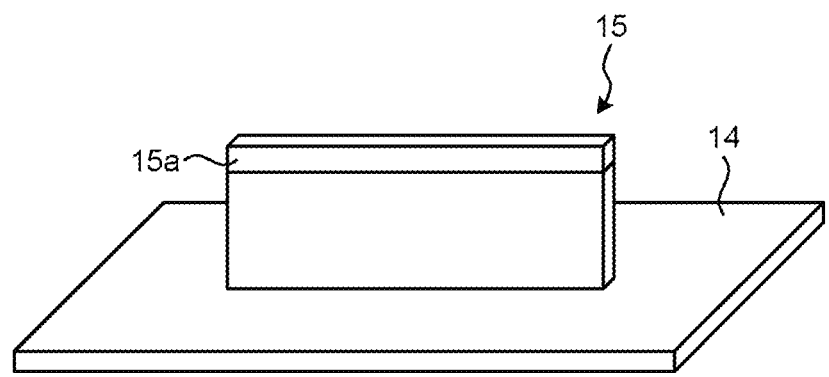
FIG. 23 is a diagram for explaining a case where a reward calculated by the reward calculating unit of the machine learning device illustrated in FIG. 20 is increased.
Figure 24:
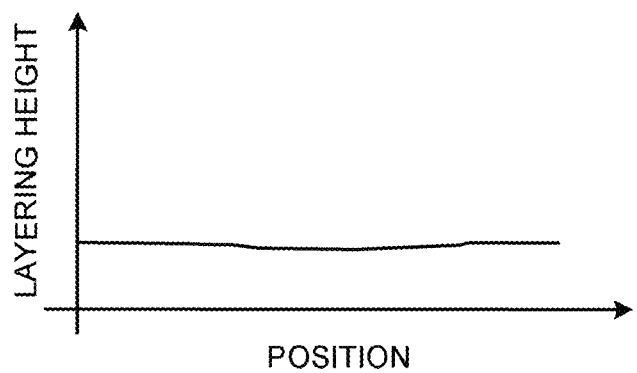
FIG. 24 is a graph for explaining the case where the reward calculated by the reward calculating unit of the machine learning device illustrated in FIG. 20 is increased.

The increase or decrease of the reward "r" calculated by the reward calculating unit 67 will now be explained. FIGS. 21 and 22 are a diagram and a graph for explaining a case where the reward calculated by the reward calculating unit of the machine learning device illustrated in FIG. 20 is decreased. FIGS. 23 and 24 are a diagram and a graph for explaining a case where the reward calculated by the reward calculating unit of the machine learning device illustrated in FIG. 20 is increased.

FIG. 21 illustrates an example of an object 15 having one layer 15a formed by the additive manufacturing apparatus 100 illustrated in FIG. 1. The graph illustrated in FIG. 22 indicates the relation between a position on a movement path and the height of the layer 15a. Assume that the height of the layer 15a in the example illustrated in FIGS. 21 and 22 varies. FIG. 23 illustrates another example of an object 15 having one layer 15a formed by the additive manufacturing apparatus 100 illustrated in FIG. 1. The graph illustrated in FIG. 24 indicates the relation between a position on a movement path and the height of the layer 15a. Assume that the height of the layer 15a in the example illustrated in FIGS. 23 and 24 varies little.

The reward calculating unit 67 calculates the variation in the height of the layer 15a on the basis of the height data 64 on the layer 15a. The reward calculating unit 67 obtains, as a value indicating the variation, a difference between the highest value and the lowest value among the values of the heights of the layer 15a at individual positions on the movement path. The reward calculating unit 67 compares the difference with a threshold. The threshold, which is set in advance, is an index for determining whether or not the variation in the height of the layer 15a is to such a degree as to affect the building quality of the object 15. The threshold is set by a user's input operation. In the example illustrated in FIGS. 21 and 22, if the reward calculating unit 67 has determined that the variation is larger than the threshold, the reward calculating unit 67 decreases the reward "r". In the example illustrated in FIGS. 23 and 24, if the reward calculating unit 67 has determined that the variation is equal to or smaller than the threshold, the reward calculating unit 67 increases the reward "r".

Figure 25:
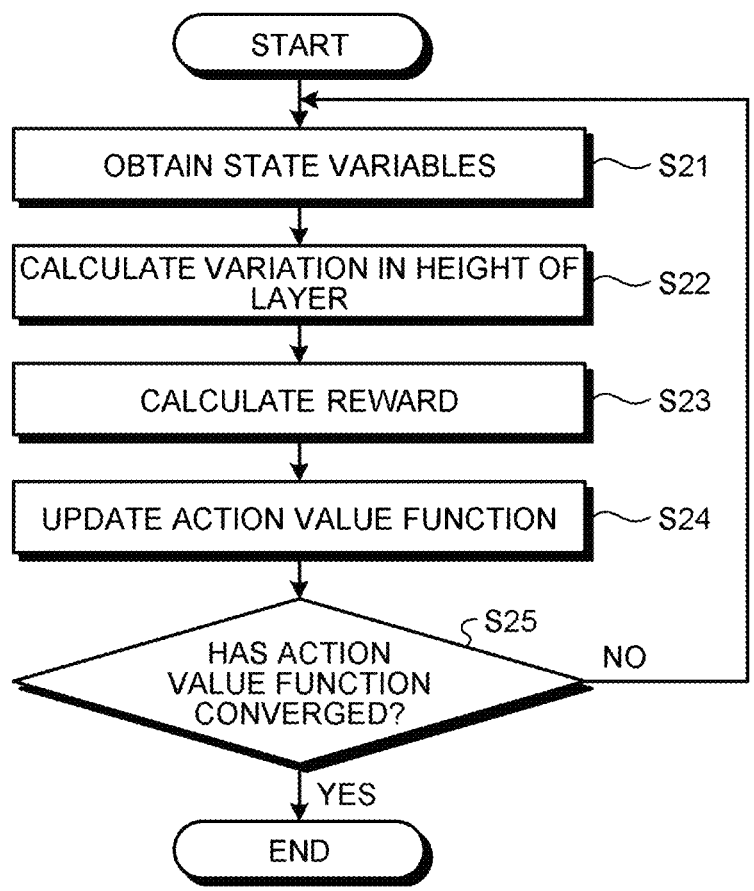
FIG. 25 is a flowchart illustrating operation procedures of the machine learning device illustrated in FIG. 20.

FIG. 25 is a flowchart illustrating operation procedures of the machine learning device illustrated in FIG. 20. A reinforcement learning method for updating the action value function Q(s,a) will be explained with reference to the flowchart of FIG. 25.

When one layer 15a is formed by the additive manufacturing apparatus 100, the state observing unit 65 obtains state variables of the layer 15a in step S21. In step S22, the reward calculating unit 67 calculates the variation in the height of the layer 15a. In step S23, the reward calculating unit 67 calculates a reward "r" on the basis of a result of comparison between the variation calculated in step S22 and a threshold.

In step S24, the function updating unit 68 updates the action value function Q(s,a) on the basis of the reward "r" calculated in step S23. The function updating unit 68 updates the action value function Q(s,a) in accordance with formula (5).

In step S25, the function updating unit 68 determines whether or not the action value function Q(s,a) has converged. The function updating unit 68 determines that the action value function Q(s,a) has converged when the action value function Q(s,a) is not updated any more in step S24.

If the action value function Q(s,a) is determined not to have converged (step S25, No), the machine learning device 61 returns the operation procedures to step S21. If the action value function Q(s,a) is determined to have converged (step S25, Yes), the learning by the learning unit 66 is terminated. The machine learning device 61 thus terminates the operation according to the procedures illustrated in FIG. 25. Note that the machine learning device 61 may return the operation procedure from step S24 to step S21 to continue learning without performing the determination in step S25.

On the basis of the result of learning by the learning unit 66, that is, the updated action value function Q(s,a), the decision making unit 62 selects a relation between the storage temperature and the layering volume, which relation provides the most rewards. The decision making unit 62 outputs the selected relation to the layering volume calculating unit 25.

While the third embodiment has been described giving the example in which the reinforcement learning is applied to the learning algorithm used by the learning unit 66, learning other than the reinforcement learning may be applied to the learning algorithm. The learning unit 66 may perform machine learning by using a known learning algorithm other than the reinforcement learning, such as deep learning, a neural network, genetic programming, functional logic programming, or a support vector machine, for example.

The machine learning device 61 is not limited to that included in the NC device 60. The machine learning device 61 may be a device external to the NC device 60. The machine learning device 61 may be a device that can be connected with the NC device 60 via a network. The machine learning device 61 may be a device present in a cloud server.

According to the third embodiment, the NC device 60 determines the relation between the storage temperature and the layering volume on the basis of a result of learning by the machine learning device 61. The layering volume calculating unit 25 can accurately calculate the layering volume of the material 5 that solidifies in a given time. As a result, the NC device 60 enables the additive manufacturing apparatus 100 to perform machining with high machining accuracy. Note that the functional configuration for machine learning described in the third embodiment may be added to the NC device 50 according to the second embodiment.

Fourth Embodiment

Figure 26:
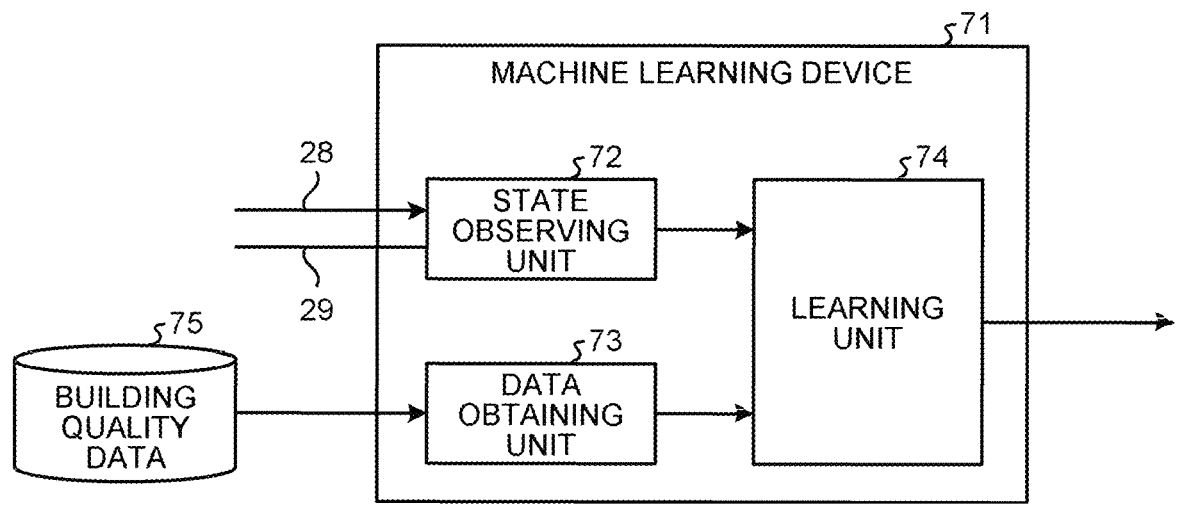
FIG. 26 is a block diagram illustrating a functional configuration of a machine learning device of a numerical control device according to a fourth embodiment of the present invention.

A fourth embodiment will be described giving an example in which the relation between the storage temperature and the layering volume is determined by supervised learning. FIG. 26 is a block diagram illustrating a functional configuration of a machine learning device of a numerical control device according to the fourth embodiment of the present invention. A machine learning device 71 according to the fourth embodiment is included in the NC device 60 similar to that in the third embodiment. The machine learning device 71 is included in the NC device 60, in place of the machine learning device 61 illustrated in FIG. 19.

In the fourth embodiment, building quality data 75 is input to the NC device 60. The building quality data 75, which is data indicating the building quality of the object 15, is input to the NC device 60 by a user who has evaluated the building quality. The modeling quality data 75 may be input to the NC device 60 by a quality evaluating device that evaluates the building quality of the object 15 on the basis of a result of measurement of the shape of the object 15. The quality evaluating device may be a device external to the NC device 60, or may be included in the NC device 60. In the fourth embodiment, the quality evaluating device is not illustrated.

The machine learning device 71 includes a state observing unit 72, a data obtaining unit 73, and a learning unit 74. The storage temperature data 28 and the layering volume data 29 are input to the state observing unit 72. The building quality data 75 is input to the data obtaining unit 73. The state observing unit 72 observes, as state variables, the storage temperature, and the layering volume calculated by the layering volume calculating unit 25. The state observing unit 72 outputs the state variables to the learning unit 74. The data obtaining unit 73 obtains the building quality data 75 that is teaching data. The data obtaining unit 73 outputs the teaching data to the learning unit 74. The learning unit 74 learns the relation between the storage temperature and the layering volume in accordance with a data set created on the basis of a combination of the teaching data and the state variables.

The learning unit 74 learns the relation between the storage temperature and the layering volume through so-called supervised learning in accordance with a neural network model, for example. Note that supervised learning refers to a model that gives a large amount of data sets to the learning unit 74 to cause the learning unit 74 to learn the features of the data sets, and estimate a result from an input. A data set includes an input and a label that is a result associated with the input. The neural network is made up of an input layer, a hidden layer, and an output layer. The input layer is defined by a plurality of neurons. The hidden layer is an intermediate layer defined by a plurality of neurons. The output layer is defined by a plurality of neurons. The number of intermediate layers may be one, or two or more.

Figure 27:
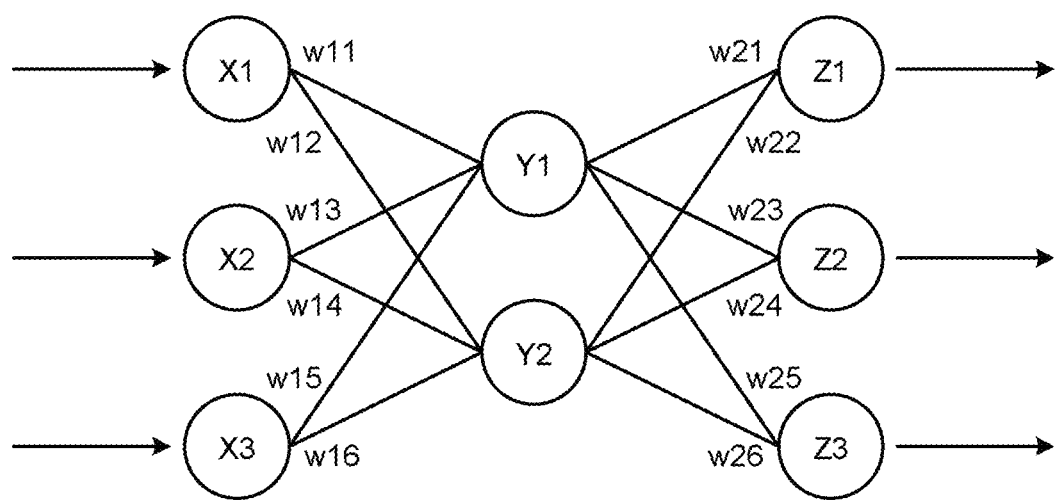
FIG. 27 is a diagram illustrating an example of a configuration of a neural network used for learning in the fourth embodiment.

FIG. 27 is a diagram illustrating an example of a configuration of a neural network used for learning in the fourth embodiment. The neural network illustrated in FIG. 27 is a neural network of three layers. An input layer includes neurons X1, X2, and X3. An intermediate layer includes neurons Y1 and Y2. An output layer includes neurons Z1, Z2, and Z3. Note that the number of neurons in each layer may be any number. A plurality of values input to the input layer are multiplied by w11, w12, w13, w14, w15, and w16 that are weights W1, and input to the intermediate layer. A plurality of values input to the intermediate layer are multiplied by w21, w22, w23, w24, w25, and w26 that are weights W2, and output from the output layer. Output results output from the output layer vary depending on the values of the weights W1 and W2.

The neural network of the learning unit 74 learns the relation between the storage temperature and the layering volume by so-called supervised learning in accordance with a data set created on the basis of a combination of the storage temperature and the layering volume observed by the state observing unit 72 and the building quality data 75 obtained by the data obtaining unit 73. Specifically, the neural network learns the relation between the storage temperature and the layering volume by adjusting the weights W1 and W2 so that the results output from the output layer in response to input of the value of the storage temperature and the value of the layering volume to the input layer become closer to the teaching data that is the building quality data 75.

The neural network may also learn the relation between the storage temperature and the layering volume through so-called unsupervised learning. Unsupervised learning refers to a model that gives a large amount of input data to the learning unit 74 without giving teaching data thereto to cause the learning unit 74 to learn how the input data is distributed.

One technique of unsupervised learning is clustering that groups input data on the basis of the similarity of input data. Using the result of clustering, the learning unit 74 assigns the outputs so that a certain criterion becomes optimum, thereby generating a predictive model of the outputs. The learning unit 74 may learn the presence and absence of an anomaly or measurement results by semi-supervised learning. The semi-supervised learning is a model that is a combination of unsupervised learning and supervised learning. The semi-supervised learning is learning that gives some pieces of input data teaching data associated with the input data without giving teaching data to the other pieces of the input data.

The learning unit 74 may learn the relation between the storage temperature and the layering volume in accordance with data sets created for a plurality of additive manufacturing apparatuses 100. The learning unit 74 may obtain data sets from a plurality of additive manufacturing apparatuses 100 used at the same site, or may obtain data sets from a plurality of additive manufacturing apparatuses 100 used at sites different from each other. The data sets may be collected from a plurality of additive manufacturing apparatuses 100 operating independently of each other at a plurality of sites. A new additive manufacturing apparatus 100 from which a data set is to be collected may be added after collection of data sets from a plurality of additive manufacturing apparatuses 100 is started. In addition, some of a plurality of additive manufacturing apparatuses 100 from which data sets are to be collected may be excluded after collection of data sets from a plurality of additive manufacturing apparatuses 100 is started.

The learning unit 74 that has performed learning in one NC device 60 may be attached to a next NC device 60 other than the one NC device 60. The learning unit 74 attached to the next NC device 60 can update the predictive model of outputs through relearning in the next NC device 60.

Deep learning that learns extraction of feature quantities may be used for the learning algorithm used by the learning unit 74. The learning unit 74 may perform machine learning in accordance with a known method other than deep learning, such as genetic programming, functional logic programming, and a support vector machine.

The machine learning device 71 is not limited to that included in the NC device 60. The machine learning device 71 may be a device external to the NC device 60. The machine learning device 71 may be a device that can be connected with the NC device 60 via a network. The machine learning device 71 may be a device present in a cloud server.

According to the fourth embodiment, the NC device 60 determines the relation between the storage temperature and the layering volume on the basis of a result of learning by the machine learning device 71. The layering volume calculating unit 25 can accurately calculate the layering volume of the material 5 that solidifies in a given time. As a result, the NC device 60 enables the additive manufacturing apparatus 100 to perform machining with high machining accuracy. Note that machine learning similar to that in the fourth embodiment may be applied to the NC device 50 according to the second embodiment.

The configurations presented in the above embodiments are examples of the present invention, and can be combined with other known technologies or can be partly omitted or modified without departing from the scope of the present invention.

REFERENCE SIGNS LIST 1, 50, 60 NC device; 2 laser oscillator; 3 fiber cable; 4 material supplying device; 5 material; 6 gas supplying device; 7 piping; 8 machining head; 9 beam nozzle; 10 material nozzle; 11 gas nozzle; 12 head drive unit; 13 stage; 14 base material; 15 modeled object; 15a layer; 20 machining program; 21 condition data table; 22 surface temperature data; 23 program analyzing unit; 24 storage temperature extracting unit; 25 layering volume calculating unit; 26 layering shape changing unit; 27 command value generating unit; 28 storage temperature data; 29 layering volume data; 31 CPU; 32 RAM; 33 ROM; 34 external storage device; 35 input/output interface; 51 shape data; 52 layering cross-section extracting unit; 53 layering condition changing unit; 61, 71 machine learning device; 62 decision making unit; 63 height measuring unit; 64 height data; 65, 72 state observing unit; 66, 74 learning unit; 67 reward calculating unit; 68 function updating unit; 73 data obtaining unit; 75 modeling quality data; 100 additive manufacturing apparatus.

The invention claimed is:

1. A numerical control device to control an additive manufacturing apparatus for producing an object by layering a material melted through irradiation with a beam, on a workpiece, the numerical control device comprising:
   storage temperature extracting circuitry to extract, from data on surface temperature of the workpiece, a value of surface temperature of the workpiece in a section of a movement path indicated in a pre-read movement command and a peripheral area of the movement path in the section, the movement path being among movement paths along which to move a supply position of the material;
   layering volume calculating circuitry to calculate a volume of a layer forming the object on the basis of a relation in which a volume of the material that solidifies in a given time decreases as the extracted value of the surface temperature becomes high; and
   layering shape changing circuitry to change a shape of the layer on the basis of the volume of the layer.

2. The numerical control device according to claim 1, wherein the layering shape changing circuitry changes the shape of the layer by changing a length of the layer.

3. The numerical control device according to claim 2, further comprising:
   layering cross-section extracting circuitry to extract, from data indicating a shape of the object, data indicating a shape of a cross section of the layer on the movement path and in the peripheral area on the workpiece, wherein
   the layering shape changing circuitry changes a height of the layer and a width of the layer on the basis of the data indicating the shape of the cross section.

4. The numerical control device according to claim 3, further comprising: layering condition changing circuitry to change, on the basis of the height of the layer and the width of the layer, a beam output and an amount of supply of the material.

5. The numerical control device according to claim 1, wherein the section comprises a plurality of sections, and the layering volume calculating circuitry changes an order of building in each of the sections included in the movement path, on the basis of the volume of the layer.

6. The numerical control device according to claim 1, further comprising:
   a machine learning device to learn the relation; and
   decision making circuitry to determine the relation on the basis of a result of learning by the machine learning device, wherein
   the machine learning device includes:
   state observing circuitry to observe, as state variables, the extracted value of the surface temperature, the volume of the layer calculated by the layering volume calculating circuitry, and the height of the layer formed on the workpiece; and
   learning circuitry to learn the relation in accordance with a training data set created on the basis of the state variables.

7. The numerical control device according to claim 6, wherein
   the learning circuitry includes:
   reward calculating circuitry to calculate a reward on the basis of the state variables; and function updating circuitry to update a function for determining the relation on the basis of the reward.

8. The numerical control device according to claim 7, wherein the reward calculating circuitry increases the reward when a variation in the height of the formed layer is equal to or smaller than a threshold, and decreases the reward when the variation in the height of the formed layer is larger than the threshold.

9. The numerical control device according to claim 1, further comprising:
- data obtaining circuitry to obtain teaching data, the teaching data being data indicating building quality of the object; and
- learning circuitry to learn the relation in accordance with a data set created on the basis of a combination of the teaching data and state variables including the extracted value of the surface temperature and the volume of the layer.

10. The numerical control device according to claim 1, wherein the numerical control device controls the additive manufacturing apparatus in accordance with a machining program, and the machining program describes the movement command for moving an irradiation position of the beam on a preset path.

11. A method for controlling, by a numerical control device, an additive manufacturing apparatus for producing an object by layering a molten material on a workpiece, the method comprising:
- extracting, from data on surface temperature of the workpiece, a value of surface temperature of the workpiece in a section of a movement path indicated in a pre-read movement command and a peripheral area of the movement path in the section, the movement path being among movement paths along which to move a supply position of the material;
- calculating a volume of a layer forming the object on the basis of a relation in which a volume of the material that solidifies in a given time decreases as the extracted value of the surface temperature becomes high; and
- changing a shape of the layer on the basis of the volume of the layer.

* * * * *